United States Patent [19]
Aoyama et al.

[11] Patent Number: 5,388,907
[45] Date of Patent: Feb. 14, 1995

[54] MEASURING APPARATUS PROVIDED WITH AN AUTOMATIC FOCUSSING DEVICE

[75] Inventors: Satoshi Aoyama, Osaka; Masayuki Yamada, Toyonaka; Tatsuaki Kusatsugu, Toyokawa; Seishiro Itoh, Toyokawa; Hiroji Tsujimura, Sakai, all of Japan

[73] Assignee: Minolta Co., Ltd., Osaka, Japan

[21] Appl. No.: 967,725

[22] Filed: Oct. 28, 1992

[30] Foreign Application Priority Data

Oct. 31, 1991 [JP] Japan .................. 3-313427
Nov. 1, 1991 [JP] Japan .................. 3-287650

[51] Int. Cl.⁶ .............................. G01J 5/02
[52] U.S. Cl. .................. 374/130; 374/120; 250/201.12
[58] Field of Search ......... 374/130, 131, 120, 121; 356/43; 359/618, 351, 419; 250/201.2, 358.1; 364/557

[56] References Cited

U.S. PATENT DOCUMENTS

| 3,745,347 | 7/1973 | de Brey et al. | 374/130 |
| 4,194,673 | 4/1990 | Imura et al. | 374/130 |
| 4,633,072 | 12/1986 | Sugiura et al. | 250/201.2 |
| 4,664,515 | 5/1987 | Imura et al. | 374/130 X |
| 4,770,528 | 9/1988 | Imura et al. | 374/130 X |
| 5,005,040 | 4/1991 | Norita et al. | 250/201.2 |
| 5,094,544 | 3/1992 | Ignatowicz | 374/129 |

FOREIGN PATENT DOCUMENTS

| 60-104735 | 7/1985 | Japan . |
| 61-19926 | 5/1986 | Japan . |
| 63-8713 | 1/1988 | Japan . |
| 63-236932 | 10/1988 | Japan . |
| 64-10785 | 1/1989 | Japan . |

Primary Examiner—William A. Cuchlinski, Jr.
Assistant Examiner—G. Bradley Bennett
Attorney, Agent, or Firm—Price, Gess & Ubell

[57] ABSTRACT

A radiation thermometer includes a temperature sensor for detecting an intensity of infrared radiation of light, a measuring optical system for introducing light from an object to the temperature sensor, a calculator for calculating a temperature of the object based on a detected infrared radiation intensity, a viewfinder for allowing the operator to visually recognize the object, a viewfinder optical system for introducing light from the object to the viewfinder, a focus detector for detecting focus condition of the measuring and viewfinder optical systems, and a controller responsive to the focus detector for controlling the measuring and viewfinder optical systems so as to come into a desired focus condition.

30 Claims, 27 Drawing Sheets

MEASURING APPARATUS PROVIDED WITH AN AUTOMATIC FOCUSSING DEVICE

BACKGROUND OF THE INVENTION AND RELATED ART STATEMENT

This invention relates to a measuring apparatus such as a radiation thermometer which, for example, receives infrared rays radiated from an object to be measured and measures the temperature of the object based on an amount of received infrared rays.

There have been generally known radiation thermometers which measure the temperature of an object to be measured in an indirect manner by focussing infrared rays radiated from an object to be measured in a specified direction by means of a focussing member such as a lens, and receiving the focused rays by a temperature measuring sensor including a photoelectric conversion element.

There has been proposed a radiation thermometer in which a spot marking device is attached to a temperature measuring optical unit. The spot marking device projects light from a light source onto the object to be measured through a masking element and an objective lens. The position and the distance of the temperature measuring optical unit relative to the object are adjusted until an image made of the light projected from the spot marking device appears sharply focused on the object, thereby confirming a measuring area, and focussing the objective lens. Such a radiation thermometer is disclosed in Japanese Unexamined Patent Publication No. 63-255630.

With this radiation thermometer, the temperature measuring area can be confirmed at a position where the objective lens is focused since the focussing is conducted. However, this radiation thermometer requires adjustment of the optical unit relative to the object in order to focus the objective lens, which is rather cumbersome. Further, the focussing is not easily conducted because a focused state of the light image formed on the object by means of the spot marking device is checked with an operator's eyes. Particularly, in the case where the object itself is bright, it is hard to see the light image, thereby making the focussing and confirmation of the temperature measuring area difficult. These are the problems residing in the above radiation thermometer.

The radiation thermometers are used for inspection and maintenance of apparatuses in a variety of industrial fields because of their capability of measuring the temperature of the object in a position spaced apart from the object. However, to this end, it is required to record what type of apparatus and of which part of the apparatus has been subjected to the temperature measurement. This operation is very cumbersome. As a means to solve this cumbersomeness, it is known that a camera is attached to a backside of the radiation thermometer so as to photograph the object image together with the measurement value.

However, in the above arrangement, an optical axis of the radiation thermometer does not correspond with that of the camera. Accordingly, there are cases where an area of the object measured by the radiation thermometer differs from an area of the object photographed by the camera, thereby presenting a temperature measuring condition imprecisely. In addition, it is difficult to manipulate this arrangement accurately.

It is an object of the invention to provide a measuring apparatus which has overcome the problems residing in the prior art.

SUMMARY OF THE INVENTION

Accordingly, the present invention is directed to a radiation thermometer comprising sensor means for detecting an intensity of infrared radiation of light, a measuring optical system for introducing light from an object to the sensor means, calculator means for calculating a temperature of the object based on a detected infrared radiation intensity, and automatic focussing means for automatically rendering the measuring optical system to come into a desired focus condition.

The radiation thermometer may be further provided with viewfinder means for allowing the operator to visually recognize the object, and a viewfinder optical system for introducing light from the object to the viewfinder means. The focussing of the measuring optical system and the viewfinder optical system may be controlled integrally with each other or separately from each other.

The automatic focussing means may be constructed by focus detection means for detecting a focus condition of the measuring optical system and controller means for controlling the focussing of the measuring optical system in accordance with a detection of the focus detection means. Also, the automatic focussing means may be constructed by distance detection means for detecting a distance to the object and controller means for controlling the focussing of the measuring optical system based on a detected distance.

The focus detection means may be constructed by a photo sensor and a focussing optical system. It is preferable that the focussing optical system introduces light from a detection area larger than a measuring detection area of the object from which light is to be introduced by the measuring optical system.

According to the present invention, further, a light measuring apparatus comprises sensor means for detecting an intensity of light, a measuring optical system for introducing light from a first detection area of an object to the sensor means, calculator means for executing a predetermined calculation based on a detected light intensity, focus detection means for detecting a focus state of the measuring optical system, the focus detection means including a photo sensor, and a focussing optical system for introducing light from a second detection area of the object to the photo sensor, the second detection area being larger than the first detection area while including the first detection area therein, controller means responsive to the focus detection means for controlling the measuring optical system so as to come into a desired focus condition.

Moreover, the present invention is directed to a light measuring apparatus comprising first sensor means sensitive to first electromagnetic radiation having a first range of wavelengths, second sensor means sensitive to second electromagnetic radiation having a second range of wavelengths different from the first electromagnetic radiation, a first optical system for introducing electromagnetic radiation from an object to the first sensor means, a second optical system for introducing the electromagnetic radiation from the object to the second sensor means, and focussing means responsive to the second sensor means for controlling the first optical system so as to come into a desired focus condition.

These and other objects, features and advantages of the present invention will become more apparent upon a reading of the following detailed description and accompanying drawings.

BRIEF DESCRIPTION OF THE DRAWINGS

FIG. 9 is a diagram showing a spatial relationship between focus condition detecting areas and a temperature measuring area;

DETAILED DESCRIPTION OF PREFERRED EMBODIMENTS OF THE INVENTION

Hereafter, a measuring apparatus according to the invention will be described, taking a radiation thermometer as an example, with reference to FIGS. 1 to 21.

Figure 2A:
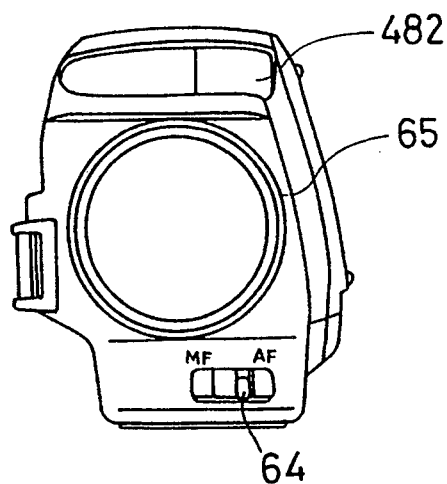
FIGS. 2A, 2B, 3A, 3B, 4A, and 4B are views showing an exemplary exterior of the radiation thermometer, FIG. 2A being a front view, FIG. 2B being a left side elevation view, FIG. 3A being a rear view, FIG. 3B being a right side elevation view, FIG. 4A being a plan view, and FIG. 4B being a bottom view.
Figure 4A:
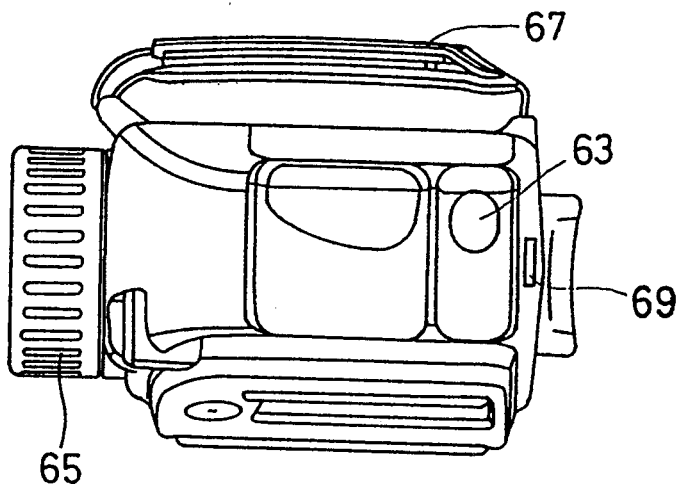
Figure 4B:
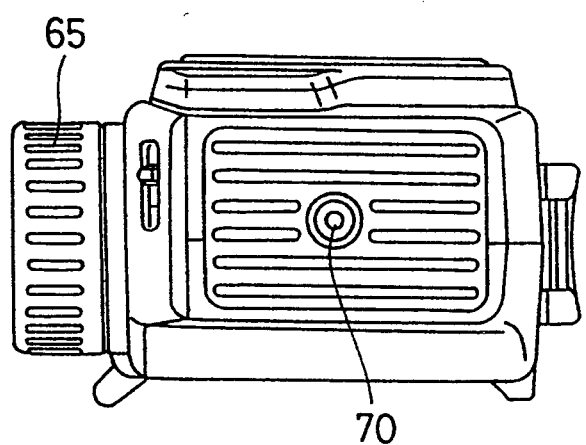

FIGS. 2A to 4B show an exemplary exterior of a radiation thermometer embodying the invention respectively. FIG. 2A is a front view; FIG. 2B is a side elevation viewed from the right side; FIG. 3A is a rear elevation; FIG. 3B is a side elevation viewed from the left side; FIG. 4A is a plan view; and FIG. 4B is a bottom view.

Figure 2B:
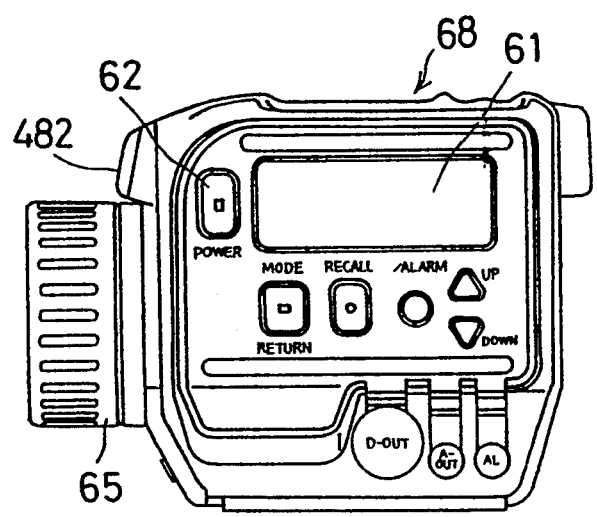
Figure 3A:
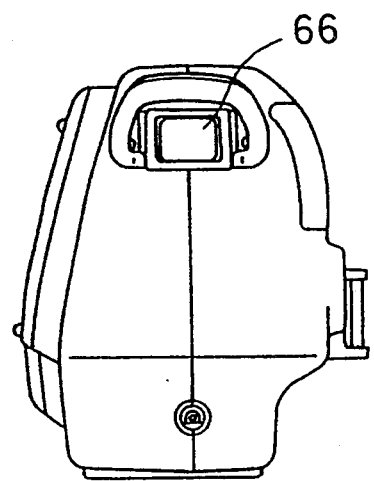
Figure 3B:
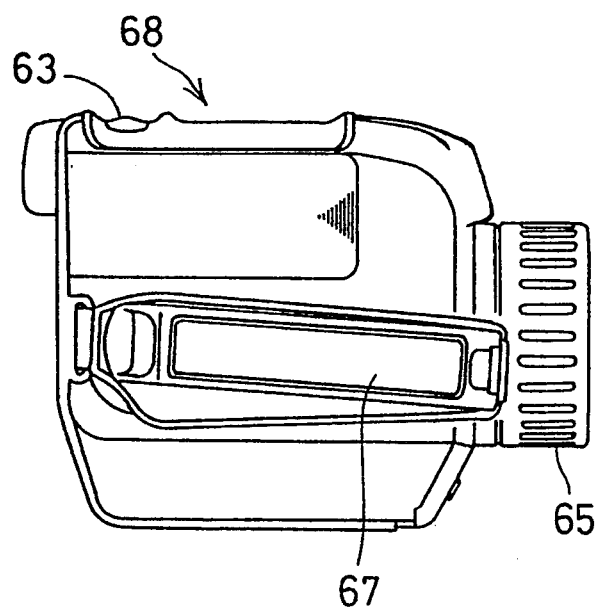

The illustrated radiation thermometer is a portable type provided internally with an automatic focussing (AF) mechanism as will be described later, and operates upon application of power from a built-in battery or an AC adapter. As shown in FIG. 2B, on a right side face of the radiation thermometer are arranged an external indicator 61 including a liquid crystal display (LCD) for displaying measured temperature data, in-focus condition, etc., a power switch 62, and other plugs used to connect the radiation thermometer with desired external apparatuses. A measurement switch 63 is arranged in a specified position on a top face of the radiation thermometer. On a front face of the radiation thermometer is defined an opening through which infrared rays radiated from an object to be measured pass. Indicated at 64 is an AF/MF changeover switch which is slidably manipulated to change a mode of measuring the distance to the object between an AF Auto Focusing mode and a MF Manual Focusing mode. When the AF/MF changeover switch 64 is set at the MF mode, a hood 65 made of elastic material such as rubber is rotated so as to move an objective lens provided in the radiation thermometer along an optical axis, thereby attaining an in-focus condition. The radiation thermometer is provided with a viewfinder system so that an operator is allowed to recognize a temperature measuring area of the object merely by looking through the viewfinder system. Indicated at 66 is an eyepiece unit. Indicated at 67 is a grip, which allows the operator to reliably hold the radiation thermometer in conjunction with a gripping structure 68 provided at the top face of the radiation thermometer. While holding the grip 67 and the gripping structure 68, the operator is allowed to manipulate the measurement switch 63. Further, indicated at 482 is a light emitter of an AF auxiliary light emitting unit 48 to be described later.

Figure 1:
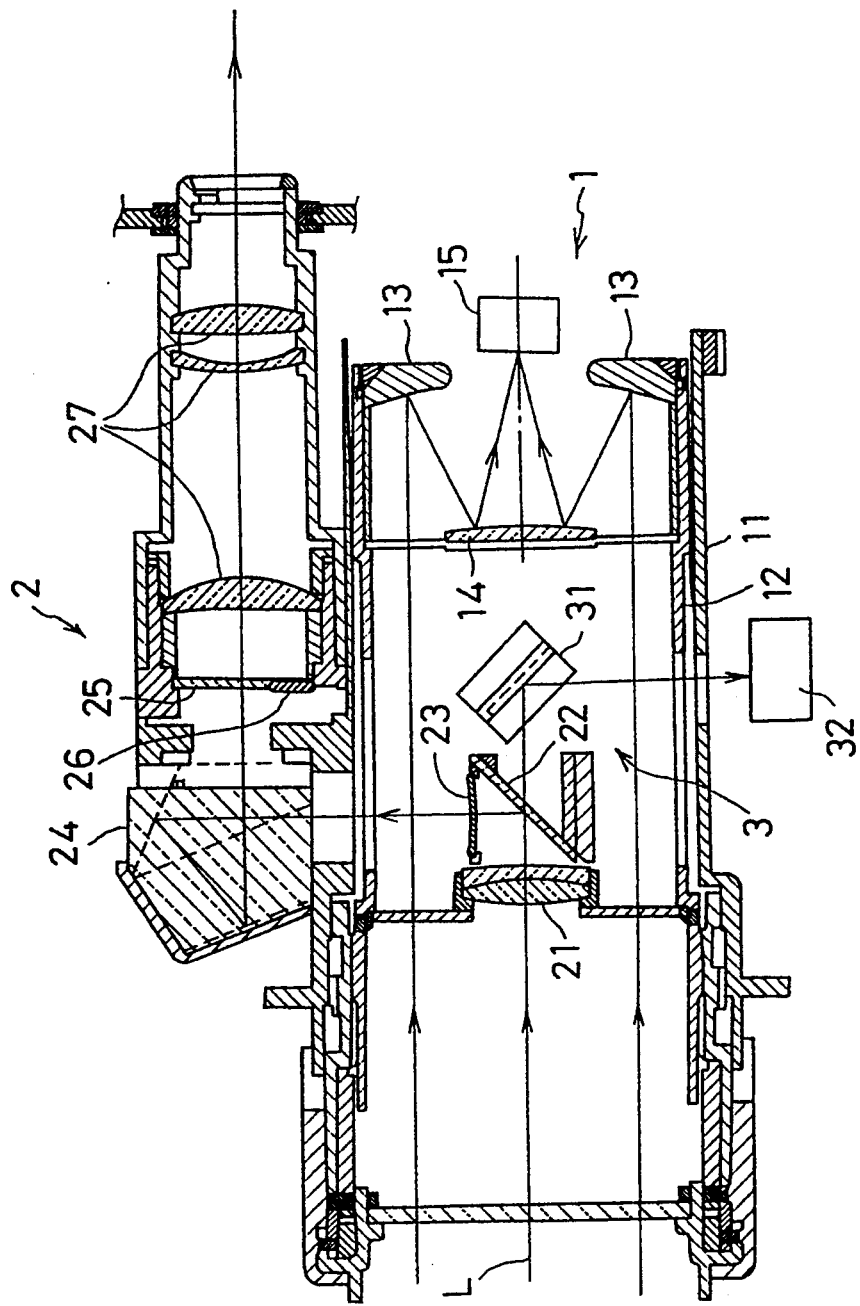
FIG. 1 is a diagram showing a construction of an optical system incorporated into a radiation thermometer according to the invention.

FIG. 1 is a diagram showing a construction of optical systems incorporated in the radiation thermometer.

This radiation thermometer is provided with a temperature measuring optical system 1, a viewfinder system 2, and an AF optical system 3. These optical systems are integrally extendible along optical axes thereof so as to attain respective in-focus conditions. The temperature measuring optical system 1 is a catoptric system for low temperature light, and the viewfinder system 2 is a dioptric system.

The temperature measuring optical system 1 is arranged symmetrically with respect to the optical axis thereof in a rear portion of a hollow cylinder body 11 secured to a main body of the radiation thermometer. The system 1 includes concave condenser lens or reflector 13, a convex reflecting mirror 14, and an infrared temperature sensor 15 which are held on a barrel 12. The barrel 12 is so constructed as to move along an optical axis L over an inner circumferential surface of the cylinder body 11 when being drivingly rotated. The barrel 12 is driven by an AF motor. The condenser lens 13 are adapted for gathering the infrared rays radiated from the object and directing the gathered rays to the mirror 14. The infrared rays reflected by the condenser lens 13 are introduced further along the optical axis by the reflecting mirror 14, and are received by the temperature sensor 15 disposed in a position where the focused rays converge. It will be appreciated that a Cassegrain-type construction is employed as a construction including the condenser lens 13, the reflecting mirror 14, and the temperature sensor 15 because of the necessity to arrange the AF optical system 2 in the cylinder body 11 for the reason to be described later.

The viewfinder system 2 is adapted for allowing the operator to visually recognize the temperature measuring area, and includes an objective lens 21, a semitransparent mirror 22, a relay lens 23, a pentagonal prism 24, an index plate 25, an internal indicator 26, and an eyepiece lens system 27. The objective lens 21 is held on the barrel 12 which is so constructed as to move along the optical axis L over the inner circumferential surface of the cylinder body 11 by being drivingly rotated. The mirror 22 and the relay lens 23 are fixedly mounted on the cylinder body 11. On the surface of the index plate 25 is described an index circle which indicates the temperature measuring area. By constructing the viewfinder system 2 extendible integrally with the AF optical system 3, the radiation thermometer is allowed to have a greater depth of focus even with a small F-number and also to attain an in-focus condition with high accuracy and ease regardless that the index plate is not of the diffusion type, but of the transmission type. This improves the accuracy of the focussing, for example, four times as high as the one obtainable in a case where the focussing is conducted manually depending upon the sight of the operator.

The AF optical system 3 shares the objective lens 21 and the semitransparent mirror 22 with the viewfinder system 2, and further includes a mirror 31 for turning an optical path downward by 90 degrees and a sensor module 32 for detecting a focus condition, the module 32 including a CCD line sensor 321 for receiving the light rays from the object. If a focal length of the objective lens 21 is set equal to that of the condenser lens 13 so that a forward principal point of the objective lens 21 corresponds with that of the condenser lens 13, the respective optical systems are allowed to attain the in-focus condition by extending them integrally.

Openings 12a, 12b are formed in the barrel 12 so that the light rays transmitted through the objective lens 21 are introduced to the pentagonal prism 24 and to the sensor module 32 respectively.

It should be noted that in a case that a dioptric system and a catoptric system are spaced apart from each other more than a given distance, it is difficult to make the forward principal point of the dioptric system to correspond with that of the catoptric system. Accordingly, in the case where the dioptric system and the catoptric system are so constructed as to extend integrally with each other by the same distance as the embodiment shown in FIG. 1, these systems may not be able to attain the in-focus conditions at the same time. In other words, if one of these optical systems is extended so as to attain the in-focus condition, the other optical system becomes out of focus (defocussed). This defocus condition is eminent in the case where the distance to the object is short and the distance between the respective forward principal points of the optical systems is large.

However, this problem can be eliminated by adopting a mechanism which makes it possible to separately move a dioptric system and a catoptric system by different feeds.

In this embodiment, the focal length of the optical system having the forward principal point which is located more forward than that of the other optical system, namely the objective lens 21, is shortened compared to the focal length of the temperature measuring optical system 1. With this arrangement, defocus amounts of the optical systems, which are caused by extending the two different optical systems integrally with each other, becomes positive for one optical system and negative for the other, thereby reducing the influence of the defocus conditions. It may be also proper to adopt a mechanism for causing the extended amounts of the respective optical systems to differ as described above.

Detailed constructions of the objective lens 21 and the CCD line sensor 321 will be described later.

Figure 5:
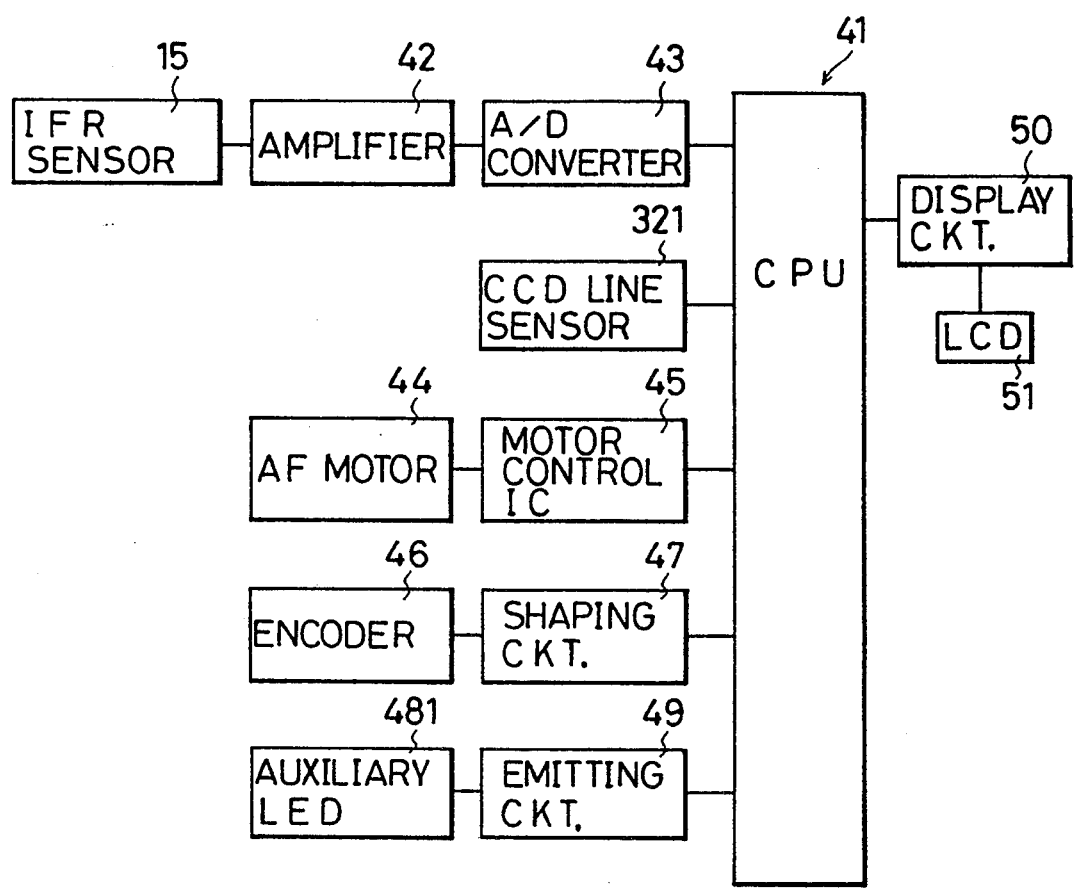
FIG. 5 is a block diagram showing electric circuitry of the radiation thermometer.
Figure 6:
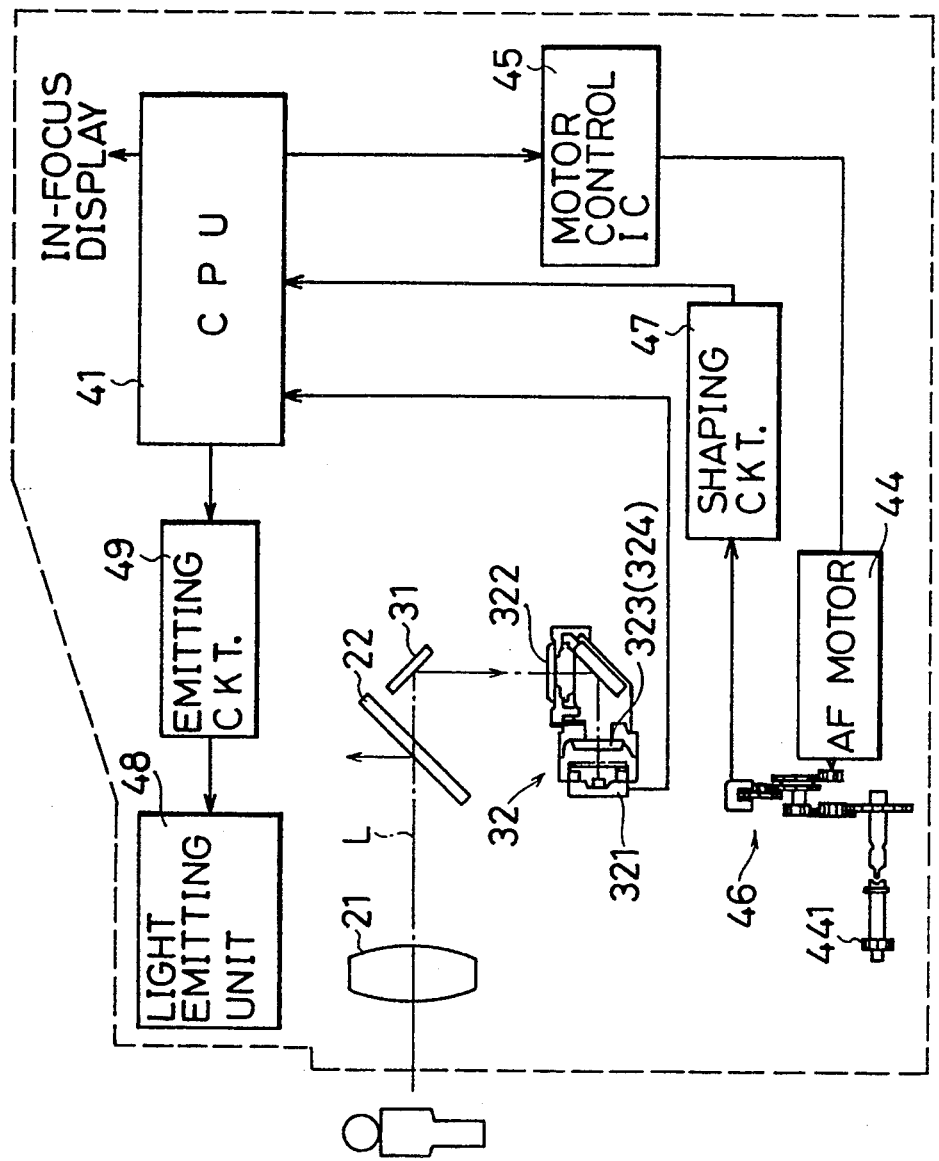
FIG. 6 is a block diagram showing an AF control system provided in the radiation thermometer.

FIG. 5 is a block diagram showing an electric circuitry of the radiation thermometer, and FIG. 6 is a block diagram showing an AF control system provided in the radiation thermometer.

This radiation thermometer is provided with a microcomputer (hereinafter referred to as a CPU) 41, a temperature measuring system, an AF controller, and a display unit. The CPU 41 is adapted for centrally controlling a focus condition detecting operation and a temperature measuring operation. The temperature measuring system includes the infrared temperature sensor 15, an amplifier 42, and an analog-to-digital (A/D) converter 43. The AF controller includes the sensor module 32 including the CCD line sensor 321, an AF motor 44, a motor control IC 45, an encoder 46, a waveform shaping circuit 47, an AF auxiliary light emitting diode 481, and a light emitting circuit 49. The display unit includes a display circuit 50 and an LCD unit 51.

The temperature sensor 15 is a temperature measuring sensor including a photoelectric conversion element, and is adapted for receiving the infrared rays radiated from the surface of the object, measuring an amount of the received infrared rays, and outputting an analog signal representative of the amount of the received infrared rays. The amplifier 42 amplifies the signal from the sensor 15, and outputs the amplified signal to the A/D converter 43. The A/D converter 43 converts the received analog signal into digital data, which is sent to the CPU 41.

The sensor module 32 includes the CCD line sensor 321, a condenser lens 322, and reimaging lenses 323, 324 (the lens 324 is not illustrated in FIG. 6). The sensor module 32 receives the rays radiated from the object and transmitted through the objective lens 21 and the like, and forms a contrast signal of the object. The CPU 41 receives a light reception signal output serially from the CCD line sensor 321, converts the received analog signal into digital data, and detects a focus condition based on obtained digital data using a phase difference detecting method.

The AF motor 44 rotates the barrel 12, i.e. the objective lens 21, integrally with the temperature measuring optical system 1 through an AF coupler 441 so as to drive the objective lens 21 along the optical axis L. A driving speed and a driving amount of the objective lens 21 are controlled by the motor control IC 45. This motor control IC 45 controls application of power to the AF motor 44 in accordance with a signal sent from the CPU 41. The objective lens 21 is caused to stay in the present position when the focus condition cannot be detected due to the low contrast level of the object, or other causes. Specifically, when the focus condition cannot be detected, the radiation thermometer is directed at a certain proximate position of the object where there exists sufficient level of contrast so as to detect the focus condition and to drive the objective lens 21 to attain the in-focus condition. The radiation thermometer is then redirected to the position of the object where the temperature thereof should be actually measured. When an initializing operation is executed such as when the power is turned on and when the radiation thermometer enters the AF mode, the barrel 12 is retracted to a furthest possible limit and a positional data indicative of the position of the objective lens 21 is rest. The objective lens 21 has the furthest possible limit and a closest possible limit. The furthest possible limit is a limit beyond which the object cannot be focused even if the lens 21 is retracted further, whereas the closest limit is a limit beyond which the object cannot be focused even if the lens 21 is extended further. In the case where the focussing is conducted manually (in the MF mode) because the focus condition cannot be detected in the AF mode, the AF coupler 441 is disconnected from the AF motor 44 in concert with actuation of the AF/MF changeover switch 64. In this case, the barrel 12 is caused to move along the optical axis L merely by rotating the hood 65.

The encoder 46 is arranged concentrically with a rotatable shaft of the AF motor 44 or a shaft of a transmission gear, and is provided with a rotatable disk having a plurality of apertures defined circumferentially in a periphery thereof, and a photointerrupter for detecting these apertures. The encoder 46 is adapted for detecting a rotating state of the rotatable disk, i.e. of the objective lens 21. Pulse signals detected by the encoder 46 are shaped into pulses of a specified level in the waveform shaping circuit 47, and are sent to the CPU 41. The CPU 41 calculates the driven amount and the driving speed of the objective lens 21 based on the number and the cycle of the pulses input from the waveform shaping circuit 47. Based on thus obtained data, the CPU 41 sends a control signal to the motor control IC 45 so as to cause the same to feed-back control to the AF motor 44.

The AF auxiliary light emitting unit 48 is provided in a specified position of a front portion of the radiation thermometer, and is used when the focus condition cannot be detected under the ambient light due to insufficient brightness. The light emitting unit 48 includes an AF auxiliary LED 481 for emitting red light, and a member having a plurality of slits for producing a specified striped pattern forward of the LED 481 when the light is emitted from the LED 481. Thus constructed light emitting unit 48 produces a patterned light image having a sufficient level of contrast. This patterned light image is reflected by the object and is incident upon the objective lens 21. The light emitting circuit 49 causes the LED 491 to emit the light for a predetermined period in accordance with an emission command signal from the CPU 41. Since the wavelength of the light emitted from the LED 481 is different from that of the infrared rays radiated from the object which are used to measure the temperature, emission of the auxiliary light does not causes an error in the temperature measurement data. In the case where these two lights include wavelength components fallen in the same band, the error is prevented from occurring by shifting an auxiliary light emission timing and a temperature measurement timing.

The display circuit 50 causes the LCD unit 51 to display the temperature measurement data, the in-focus condition, etc. This LCD unit 51 includes the external indicator 61 shown in FIG. 2 and the internal indicator 26 provided in a specified position of the index plate 25 incorporated into the viewfinder system 2.

Figure 7:
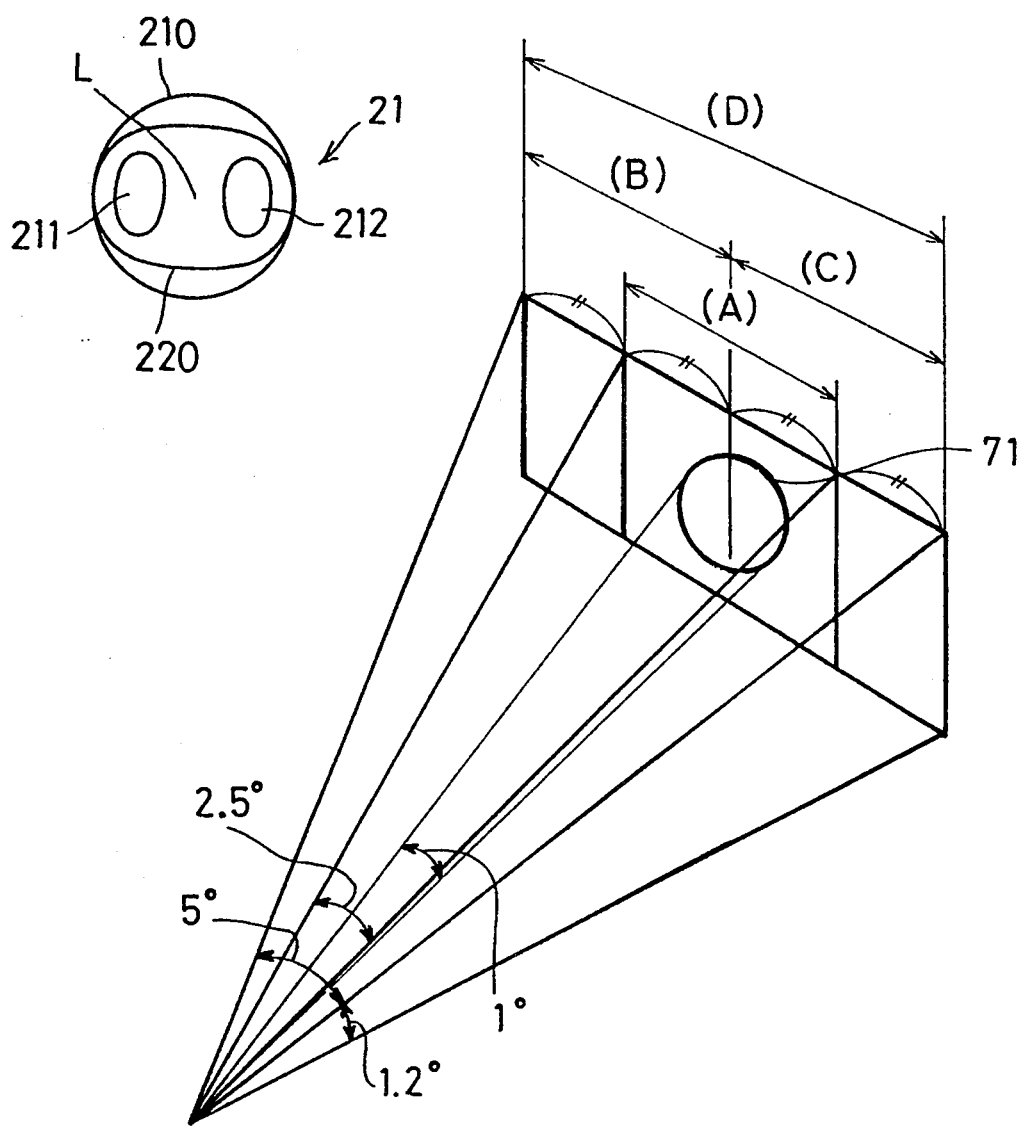
FIG. 7 is a diagram showing a construction of an objective lens.

FIG. 7 is a diagram showing a construction of the objective lens 21.

The objective lens 21 used in this radiation thermometer is adapted for detecting the focus condition according to the phase difference detecting method to be described later. It is not all the beams of light transmitted through the objective lens 21, but beams of light transmitted through two areas 211, 212 arranged symmetrically with respect to the optical axis L that are used to detect the focus condition. Accordingly, the objective lens 21 is constructed so that an elliptic effective lens area 220 is formed as opposed to a circular contour 210 of the lens 21. By constructing the objective lens 21 as above and holding the lens 21 at a portion outside the effective lens area 220, the optical system can be made of a smaller size. Also, it is sufficient to introduce only the beams of light transmitted through the effective lens area 220 to the viewfinder system 2. It is not limited to the portion outside the effective lens area 220 to be held, but the relay lens 22 located behind the objective lens 21 may be held, for example.

Figure 8:
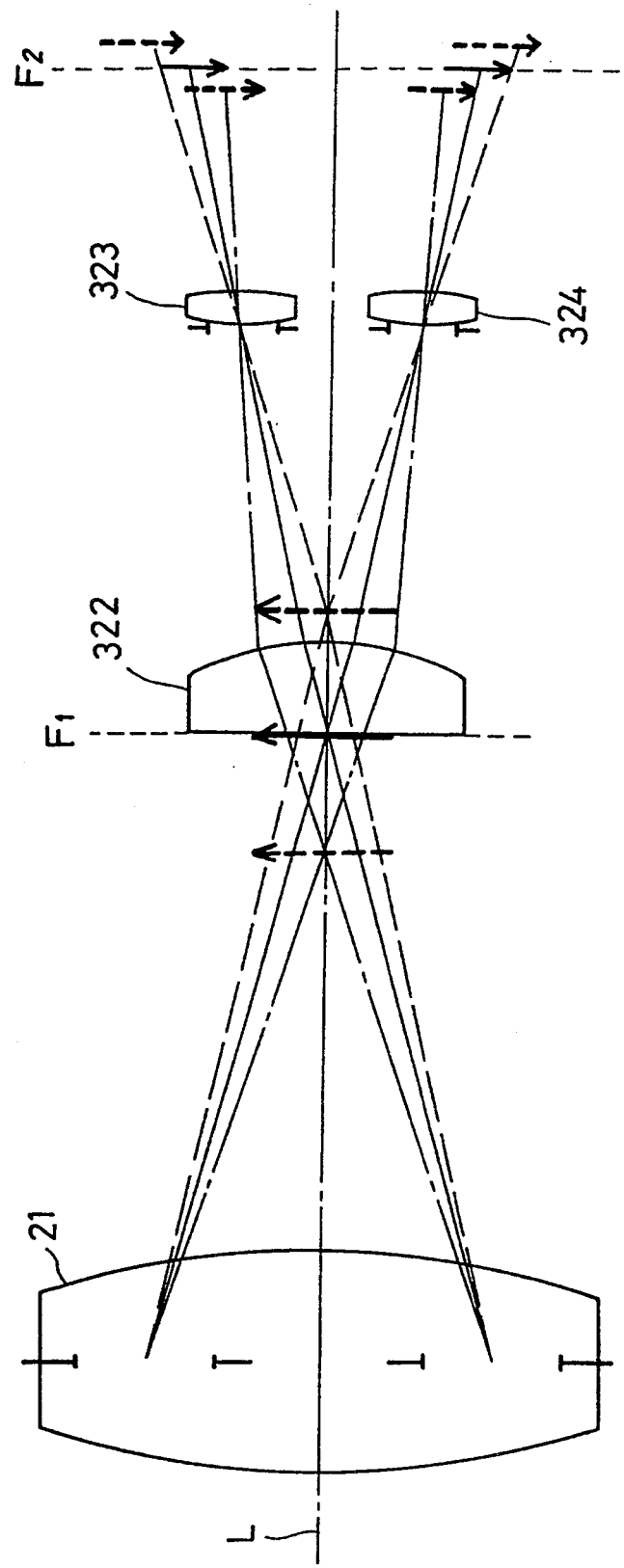
FIG. 8 is a diagram of an optical system provided in the radiation thermometer, showing the principle of detection of the focus condition according to the phase difference detecting method.

FIG. 8 is a diagram showing an optical system for explaining the principle of direction of the focus condition according to the phase difference detecting method.

This method works in the following manner. The beams of light radiated from the object and transmitted through the areas 211, 212 (see FIG. 7) of the objective lens 21 which are in symmetrical relation to each other with respect to the optical axis L are reimaged so as to form two images. Then, there are obtained a relative positional relationship of these two images, defocus amounts and defocus directions (whether the imaging positions are located in front of or behind the predicted focussing positions, i.e. a front focus or rear focus) of the respective imaging positions from predicted focussing positions.

A predicted focussing plane F1 is located behind the objective lens 21. Behind the plane F1 is located the condenser lens 322. Behind the lens 322 is further located the reimaging lenses 323, 324. On an imaging plane F2 of the reimaging lenses 323, 324 is arranged, for example, the CCD line sensor 321. The CCD line sensor 321 includes a sensor array having a base section and a reference section arranged in line and spaced apart by a specified distance. The reformed images come closer to the optical axis L, thereby coming closer to each other, in the case where the images of the object to be focused are formed forward of the predicted focussing plane F2, i.e. in the case of the front focus. Conversely, these reformed images are put away from the optical axis L in the case of the rear focus. When the in-focus condition is attained, the phase difference at which contrast conditions of the two images correspond with each other, i.e. the distance between the two images, becomes a specific distance specified by the construction of the AF optical system 3. Thus, in principle, if the distance between the two images is detected, the focus condition can be obtained.

The following two essential points are required for measurement by means of the radiation thermometer. The first point is that the temperature measuring area of the radiation thermometer is a small area defined by a circle having a measurement angle of 1 degree (spot area). The measurement angle is a vertical angle of a cone defined by the circular temperature measuring area and the radiation thermometer. It is preferable to attain the in-focus condition with respect to this temperature measuring area. If the radiation thermometer is out of focus, the temperature of the temperature measuring area cannot be measured accurately since radiation energy from an area outside the above circle is mixed into the light used to measure the temperature.

The second point is that the object essentially has a sufficient level of contrast in order to detect the focus condition using the phase difference detecting method. Since it is highly unlikely that the contrast is found in the small temperature measuring area, a focus condition detecting area is set larger than the temperature measuring area so as to increase a probability that the contrast is found therein. In this embodiment, the focus condition detecting area is set as a rectangular area (width 2.5°×length 1.2°. Here, the width is determined by a vertical angle of a triangle whose bottom side is a horizontal side of the rectangular detecting area, the length is determined by a vertical angle of a triangle whose bottom side is a vertical side of the rectangular detecting area. By setting the focus condition detecting area laterally long in this way, the contrast becomes easy to obtain in an arranging direction of the CCD line sensor 321. As a measure in the case where the contrast cannot be found in the focus condition detecting area, it may be appropriate to transfer the focus condition detecting area to a proximate position, and to detect the focus condition in the transferred area. Then, the radiation thermometer is directed at the original temperature measuring area so as to measure the temperature based on the detected focus condition. This method is effective in the case where the temperature measuring area and the tentative focus condition detecting area are equi-distant from the radiation thermometer. Further in the case where the contrast of the surface of the object including the temperature measuring area varies smoothly, the focus condition can be detected more accurately by taking a wider focus condition detecting area. In view of this, for example, a wider focus condition detecting area (e.g. width 5°×length 1.2°) is defined in this embodiment.

For instance, in the case where the temperature of a thin and long object, such as an electric wire, is measured, the radiation thermometer is obliged to have a laterally long temperature measuring area. For such a radiation thermometer, the contrast is obtainable at upper and lower edges of the electric wire by taking a longitudinally long focus condition detecting area. Further, it is convenient to make the relationship between the temperature measuring area and the focus condition detecting area variable by, for example, rotating the sensor module 32, because the focus condition detecting area can be changed desirably according to the contrast pattern.

Figure 10:
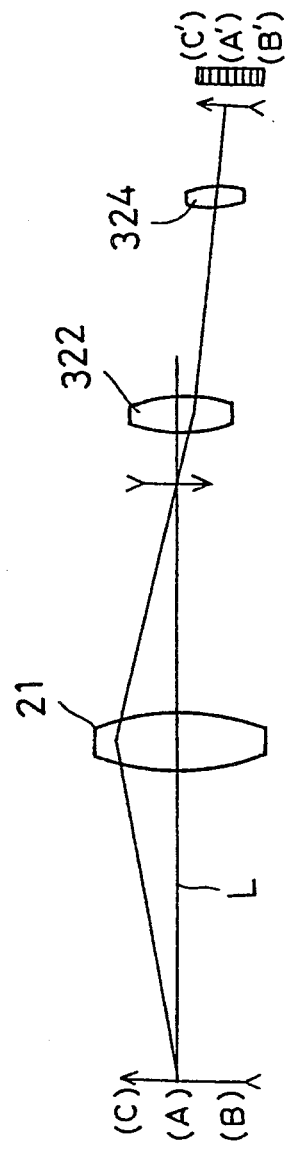
FIG. 10 is a diagram showing a positional relationship between the temperature measuring area and a CCD line sensor.

FIG. 9 is a diagram showing a spatial relationship between the focus condition detecting area and the temperature measuring areas, and FIG. 10 is a diagram showing a positional relationship between the temperature measuring area and the CCD line sensor 321.

In FIG. 9, indicated at 71 is a circle representative of the temperature measuring area, at (A) a center focus condition detecting area, at (B), (C) left and right focus condition detecting areas, and at (D) an entire focus condition detecting area. Since images corresponding to the focus detecting areas (A), (B), and (C) are reformed on sections (A'), (B'), and (C') of the CCD line sensor 321, the CCD line sensor 321 is divided into blocks corresponding to these sections. After being read from the CCD line sensor 321 by the CPU 41, the light reception signal is read for each block of the sensor 321. Then, the phase difference in each detecting area is detected, and thereby the focus conditions detected in each detecting areas is obtained. With this arrangement, the detection of the focus condition can be made upon completion of only one electric charge storing operation in the CCD line sensor 321. Further, if an arrangement is made such that the striped contrast pattern produced by the AF auxiliary LED 481 falls upon each of the focus condition detecting blocks properly, a defocus amount in each block can be obtained even in the focus condition detection with the use of the LED 481. In this case, a contrast pattern for the entire focus condition detecting area (D) is not particularly necessary.

The light reception signal read from the CCD line sensor 321 into the CPU 41 is converted from analog form into digital form, and then have offset amounts added thereto in order to reduce noise components of the CCD line sensor 321 relative to signal components. Further, a centroid conversion is applied to this signal using data represented in a plurality of adjacently located pixels of the CCD in order to reduce direct current error components inherent in the optical system or the like. In the phase difference detection, thus processed data are used.

The phase difference detection is conducted in the following manner. Two images, namely images formed on the base and the reference sections of the CCD line sensor 321, are shifted by one frame so as to take correlation thereof, and the minimum pixel-to-pixel correlational value is obtained. Further, the more detailed minimum value is obtained by interpolating the correlational value between the pixels in order to increase the resolving power. The minimum value is represented as a YM value, and the image distance, i.e. the distance between the images (phase difference), when the minimum value is obtained is represented as an XM value. Thus obtained YM and XM values are used as focus information. Discrimination on whether the image distance includes a real focus information is made by comparing a C value, which is obtained by integrating the distance between two adjacently arranged pixels, and a YM/C value with corresponding predetermined constants.

More specifically, the image distance is considered to be highly reliable only when (C value≧a specific constant) and (YM/C value≦a specific constant), and the XM value at that time is used as the image distance. Otherwise, the image distance is considered to be unreliable, and thereby it is judged that the focus condition cannot be detected (low contrast). The reliable XM value is converted into a defocus amount DF (a shifted amount of the image from the predicted focussing plane) which serves as an actual focus information.

Figure 11:
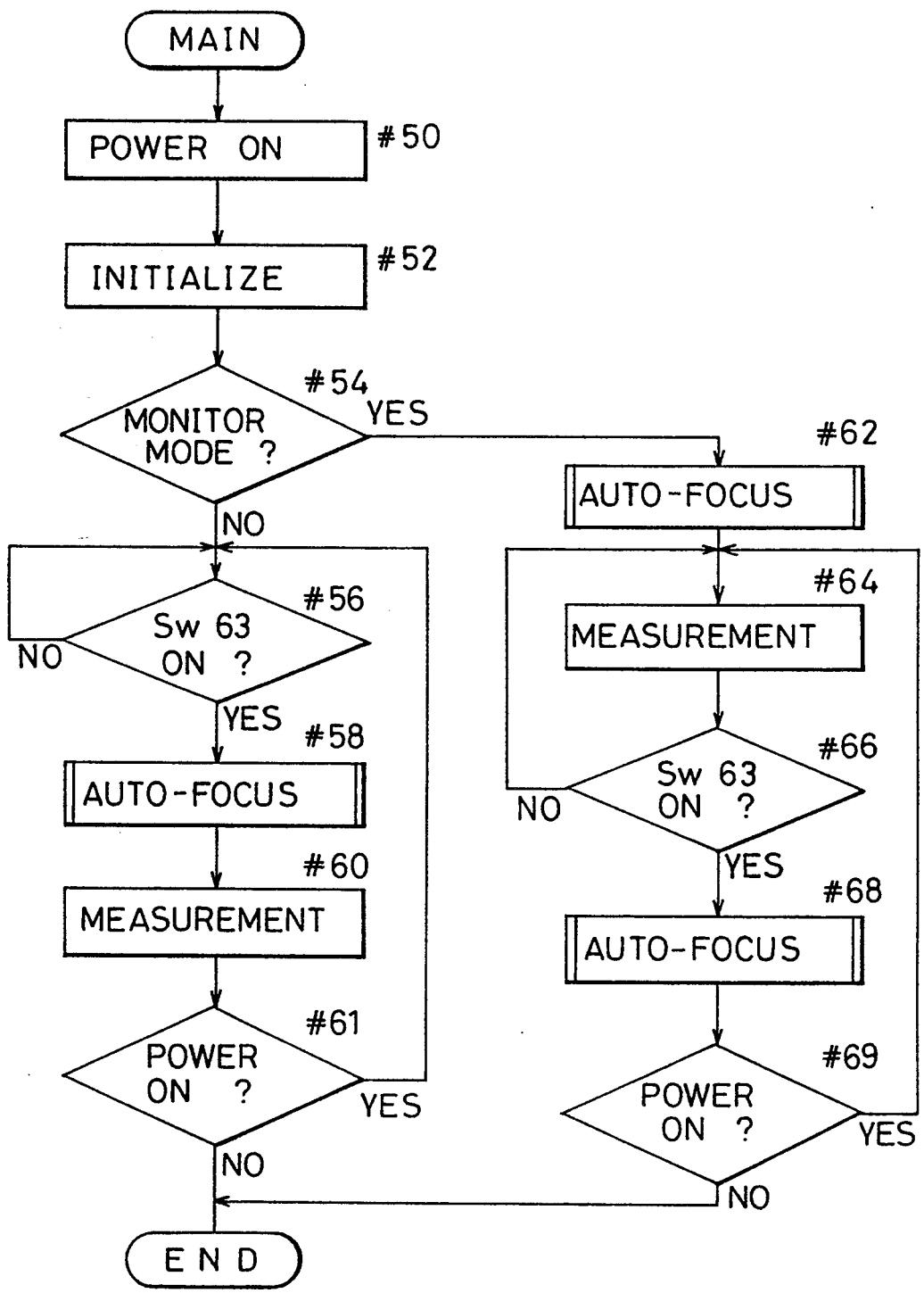
FIG. 11 is a flow chart showing a main routine of operations of the radiation thermometer, i.e., an automatic focussing operation and a temperature measuring operation.

The automatic focussing operation (AF operation) and the temperature measuring operation will be described next with reference to a flow chart shown in FIG. 11.

In this flow chart, there are available a monitor mode and a handy mode in view of the relationship between the temperature measurement and the automatic focussing. In the monitor mode, the temperature measurement is constantly conducted while the power is one. In the handy mode, the temperature measurement is conducted only while the measurement switch 63 is depressed.

In either mode, the AF operation is executed, i.e. the focus condition is detected and the objective lens is driven to attain the in-focus condition, while the switch 63 is depressed. In this case, there is the likelihood that a large amount of electric current flows when the AF motor 44 is driven, thereby generating an electric noise in the temperature measuring system. Also, it is impossible for a single CPU to conduct the temperature measurement and the automatic focussing in a parallel manner. Accordingly, the temperature measurement and the automatic focussing are conducted alternately. Further, the data available when the electric noise is generated may be ignored by detecting generation of the electric noise or taking correlation of consecutive temperature measurement data. These is also available a one-shot mode wherein the AF operation is conducted even without depressing the measurement switch 63 each time the radiation thermometer enters the monitor mode. The one-shot mode ends once the in-focus condition is attained.

When the power switch 62 of radiation thermometer is turned on in Step #50, various data and flags in addition to the respective mechanisms are initialized in Step #52. Subsequently, it is discriminated whether the monitor mode is set in Step #54. This routine proceeds to Step #62 if the monitor mode is set (YES in Step #54), while proceeding to Step #56 if the handy mode is set (NO in Step #54).

In Step #56, it is discriminated whether the measurement switch 63 is in the ON state. If the switch 63 is in the ON state (YES in Step #56), the AF operation is conducted in Step #58. Upon completion of the AF operation, the temperature measurement is started in Step #60. Thereafter, in Step #61, it is discriminated whether the power switch 62 is in the ON state. If the power switch 62 is in the ON state (YES in Step #61), this routine returns to Step #56. If the power switch 62 is in the OFF state (NO in Step #61), on the other hand, this routine ends.

If the monitor mode is discriminated to be set (YES in Step #54), the radiation thermometer temporarily enters the one-shot mode and the AF operation is conducted in Step #62. Upon completion of the AF operation in the one-shot mode, the temperature measurement is conducted in Step #64. Thereafter, it is discriminated whether the measurement switch 63 is in the ON state in Step #66. If the switch 63 is in the ON state (YES in Step #66), the AF operation is conducted to attain the in-focus condition again in Step #68. Thereafter, in Step #69, it is discriminated whether the power switch 62 is in the ON state. If the power switch 62 is in the ON state (YES in Step #69), this routine returns to Step #64 in which the temperature measurement is conducted again. If the power switch 62 is in the OFF state (NO in Step #61), on the other hand, this routine ends. If the switch 63 is in the OFF state (NO in Step #66), the temperature measurement is repeated continuously.

In conducting the first temperature measurement after the power is applied and the measurement switch 63 is turned on, if the AF operation is conducted utilizing a standby time to stabilize operations of the temperature measuring circuitry, a time which lasts until the temperature measurement is started following turning-on of the switch 63 can be effectively utilized.

The AF operation will be described in detail next with reference to flow charts shown in FIGS. 12 to 21.

Figure 12:
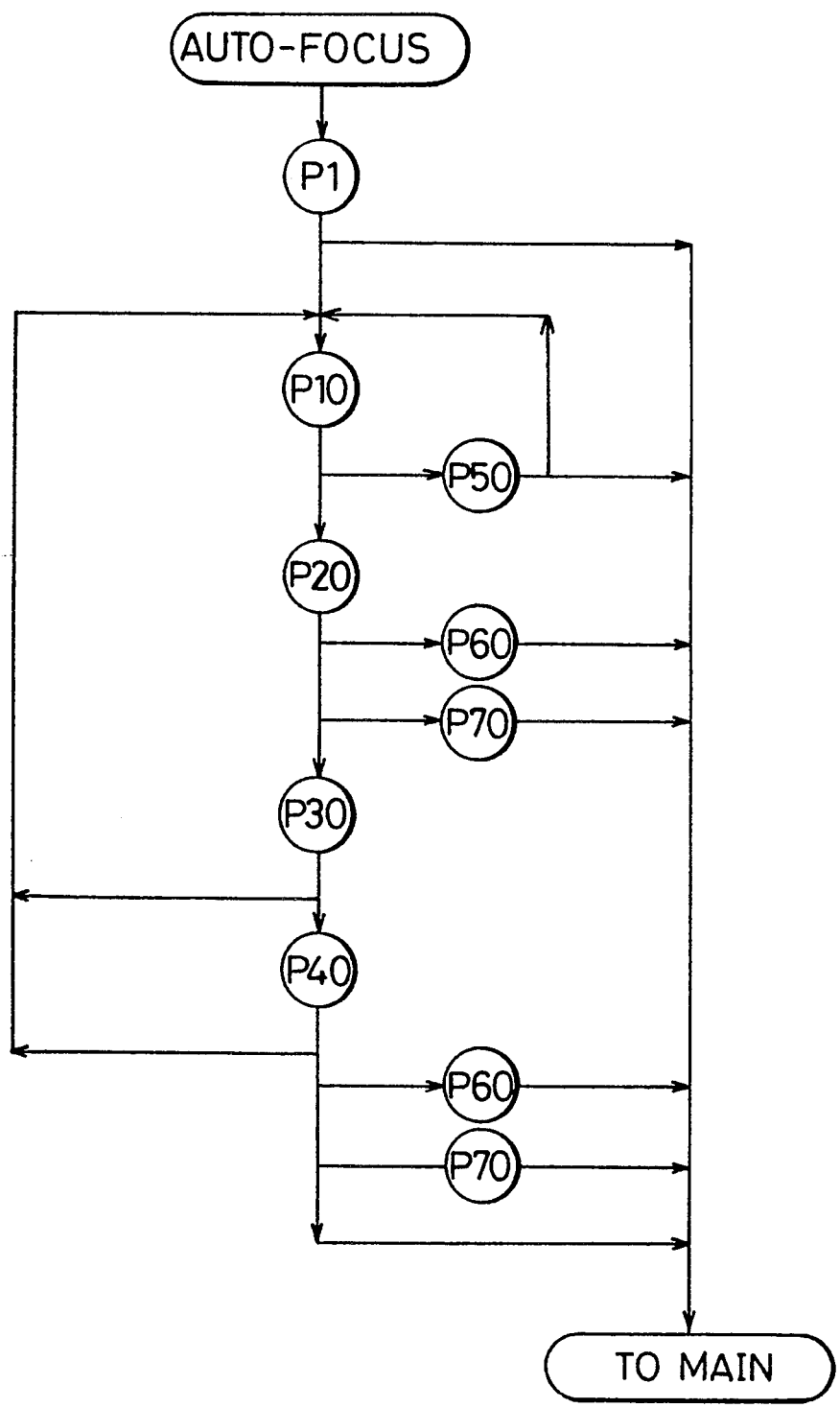
FIG. 12 is a flow chart showing a main routine of the automatic focussing operation.

FIG. 12 is a flow chart showing a main routine of the AF operation. In this main routine, contents of respective processings are indicated at P10 to P70. Detailed processing contents will be described with reference to the following flow charts.

Figure 13:
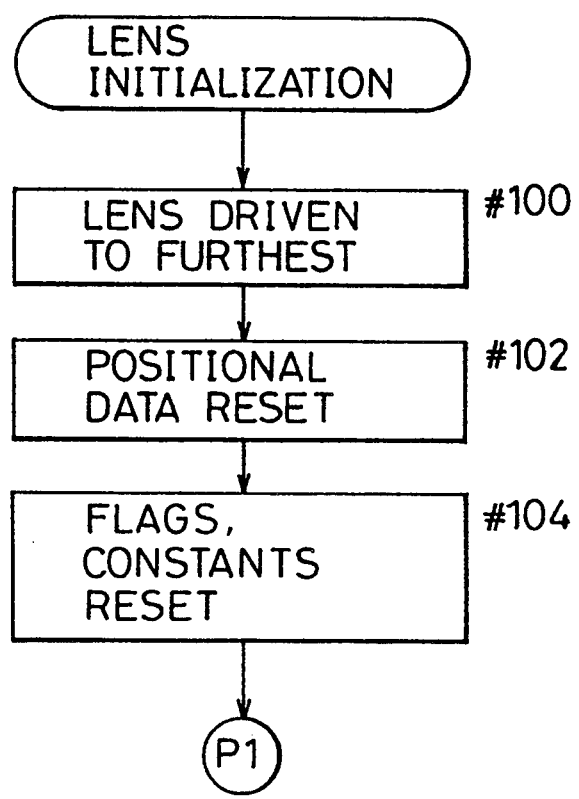
FIG. 13 is a flow chart showing an initializing operation for a lens in the automatic focussing operation.

Upon start of the AF operation, an initialization for the lens is conducted according to a flow chart shown in FIG. 13, and an initialization for the focus condition detecting system is conducted in P1. If the AF operation is prohibited, the main routine ends. Otherwise, a focus condition is detected in P10. If the low contrast state is detected as a result of the focus condition detection, a compensatory processing is executed in P50. Thereupon, the radiation thermometer enters an auxiliary light emission mode and the focus condition is detected again. In the case where the low contrast state is detected consecutively twice, the AF operation is terminated. On the other hand, if the low contrast state is not detected, a processing is executed to discriminate whether the in-focus condition is attainable based on the detected focus condition in P20.

If the object is discriminated to be more distant than a furthest limit of a measurable range of the radiation thermometer for some cause, or if the object is discriminated to be closer than a closest limit of the measurable range of the radiation thermometer, the AF operation is terminated after a low contrast processing is executed in P60. On the other hand, it is determined that the in-focus condition has been attained, the AF operation is completed after an in-focus processing is executed in P70.

If the focal length of the objective lens 21 lies beyond an in-focus range in P20, the objective lens 21 is driven in P30 and a drive check is conducted in P40. If the objective lens 21 reaches a limit (either a furthest possible limit or closest possible limit), this routine returns to P10 in which the focus condition is detected. Further, if the in-focus condition cannot be attained despite the fact that the lens 21 is driven a specified number of times in P40, this routine returns to P10 in which the focus condition is detected. The number of the drive check is limited to a predetermined number as described later for a power-saving purpose. If it is checked that the in-focus condition has not been attained after the driving of the objective lens 21, there are following three ways to take: 1) the AF operation is given up so as to save the power (P60); 2) The AF operation is completed on the assumption that the in-focus condition is probably attainable (P70); and 3) The radiation thermometer proceeds to the temperature measurement after interrupting the AF operation in order to prioritize the temperature measurement.

The first way is: the AF operation is terminated in view of power-saving in the case where the in-focus condition could not be attained despite the fact that the focus condition has been detected the predetermined number of times while emitting the auxiliary light. The second way is: in the case where a driving amount of the lens is small, it is determined that the in-focus condition has been attained without conducting a confirmatory detection of the focus condition on the assumption that the focal length of the objective lens 21 will lie in the in-focus range after the driving thereof.

Redetection of the focus condition where the lens 21 is positioned at the limit thereof means that the focus condition is detected again in the case where the driving of the objective lens 21 is stopped when the lens 21 reaches the limit or when a load is exerted upon the barrel 12 before the lens 21 is driven by an amount corresponding to the control defocus amount CDF.

FIG. 13 is a flow chart showing an initializing operation for the lens in the AF operation. This operation is an operation executed in Step #52 of FIG. 11. This operation is also executed when the MF mode is changed to the AF mode.

First of all, the objective lens 21 is driven to the furthest possible limit in Step #100, and a positional data representative of the position of the lens 21 is reset in Step #102. Flags, constants, etc. are reset in Step #104 which is followed by P1.

Figure 14:
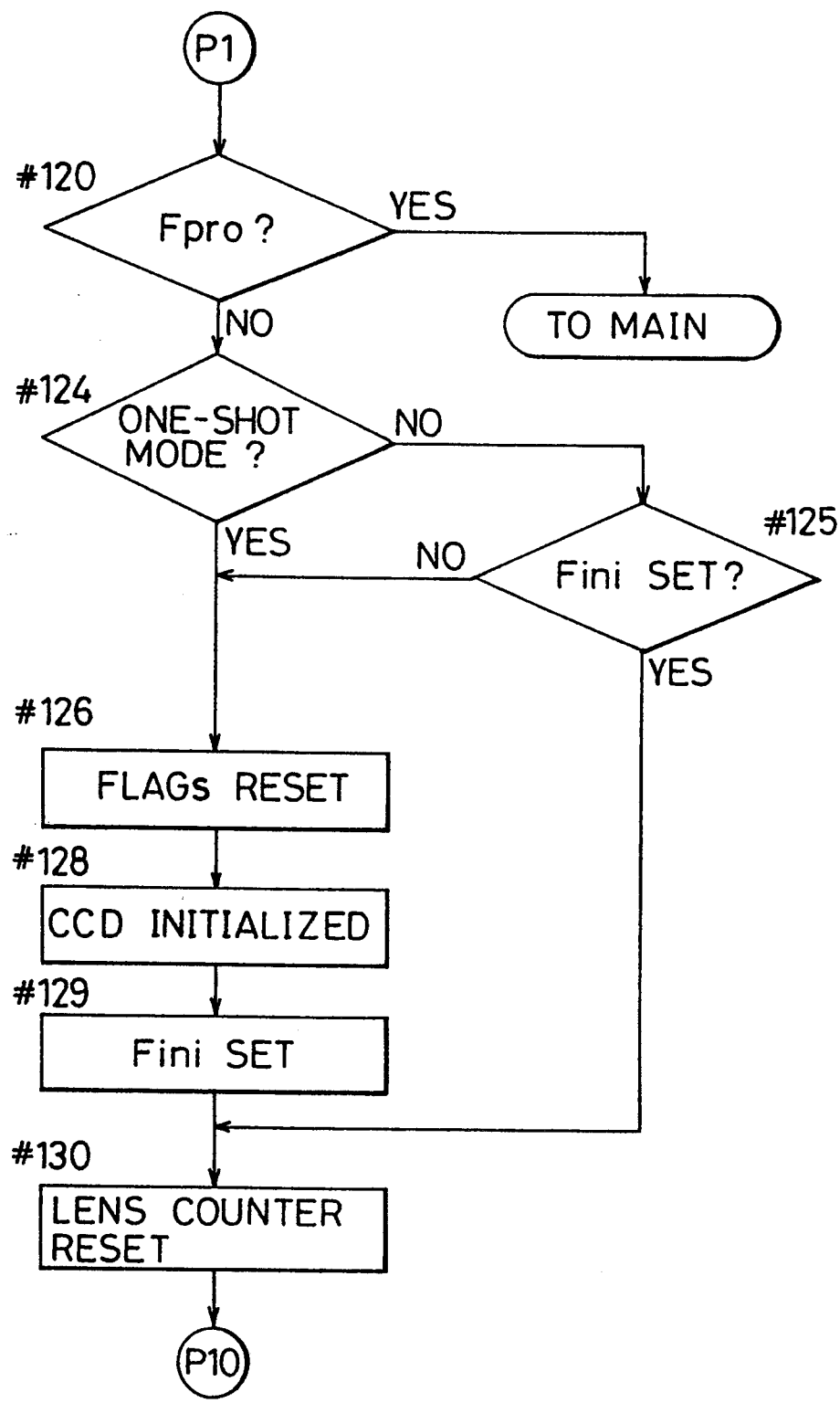
FIG. 14 is a flow chart showing an initializing operation for a focus condition detecting system.

FIG. 14 is a flow chart showing an initializing operation for the focus condition detecting system.

First of all, it is discriminated whether an AF prohibition flag Fpro indicative of an AF operation prohibited state is set in Step #120. If the AF operation is prohibited (YES in Step #120), this routine returns to the main routine. On the other hand, the AF operation is permitted (NO in Step #120), it is discriminated whether the one-shot mode has been designated in Step #124. If the one-shot mode is set (YES in Step #124), various flags used in this mode are reset in Step #126, and the CCD line sensor 321 is initialized, i.e. electric charges residual therein are removed in Step #128. In Step #129, an initialize completion flag Fini is set which is indicative of completion of the initializing operation. Subsequently, a counter for counting a lens driving number indicative of the number of times the objective lens 21 is driven is reset in Step #130. If the one-shot mode is not set (NO in Step #124), this routine proceeds to Step #125. This routine proceeds to Step #126 in the case where the flag Fini is not set (NO in Step #125) while proceeding to Step #130 in the case where the flag Fini is set (YES in Step #125). Step #130 is followed by P10. It will be noted that the lens driving direction is not initialized, and accordingly the previous lens driving direction is stored until the power is turned off.

Figure 15:
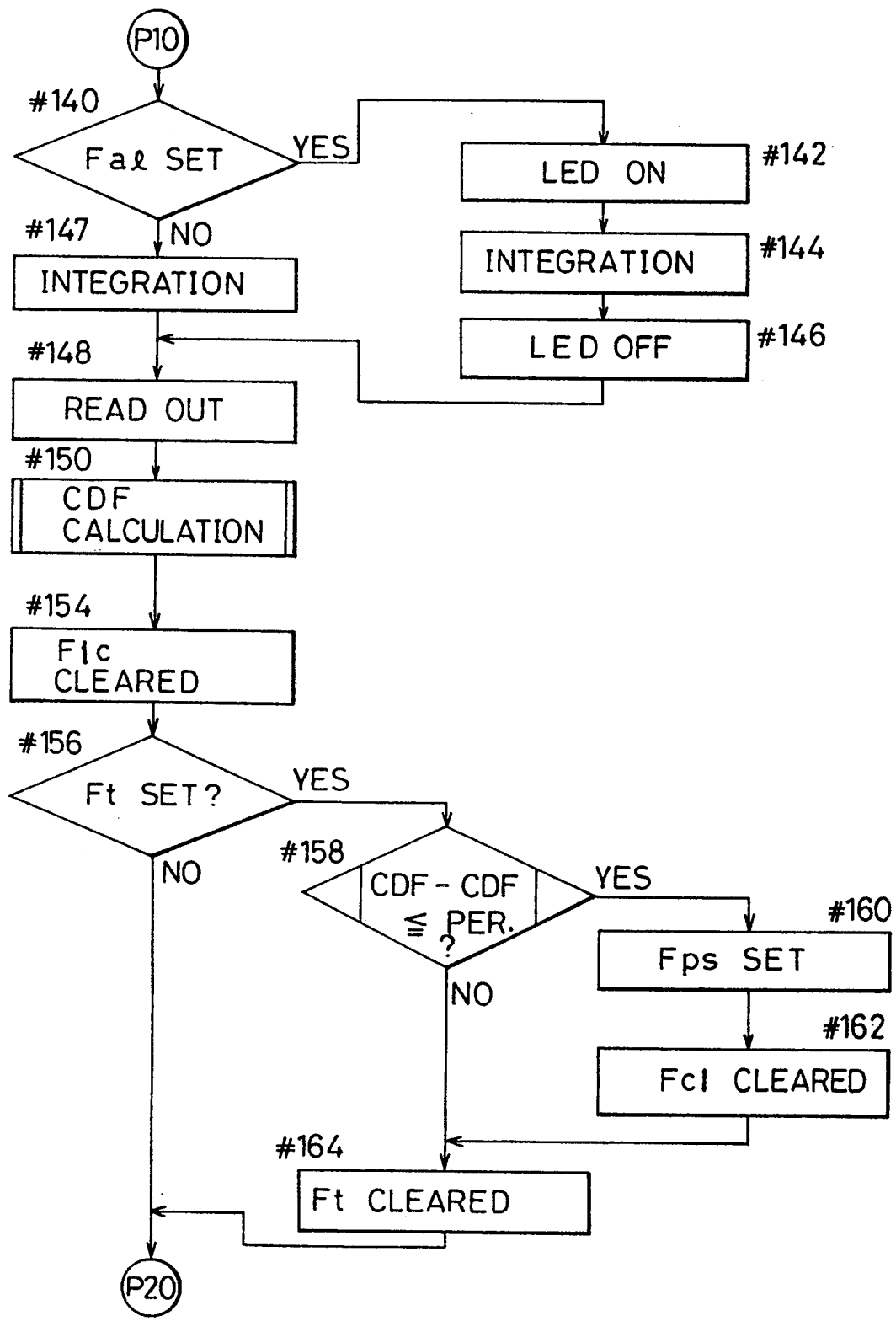
FIG. 15 is a flow chart showing a focus condition detecting operation and a detection checking operation.

FIG. 15 is a flow chart showing the focus condition detecting operation and a detection checking operation.

First of all, it is discriminated whether the auxiliary light emission mode has been designated based on the auxiliary light emission mode flag Fal in Step #140. If the auxiliary light emission mode is set (YES in Step #140), the LED 481 is turned on in Step #142. In Step #144, the light radiated from the object is received by the CCD line sensor 321, and electric charges corresponding to an amount of the received light are stored, i.e. integrated. Upon completion of the integration, the LED 481 is turned off in Step #146. If the flag Fal is not set (NO in Step #140), the integration is conducted in the CCD line sensor 321 in Step #147. In Step #148, the light reception signal is read out of the CCD line sensor 321 serially by the CPU 41.

Figure 16:
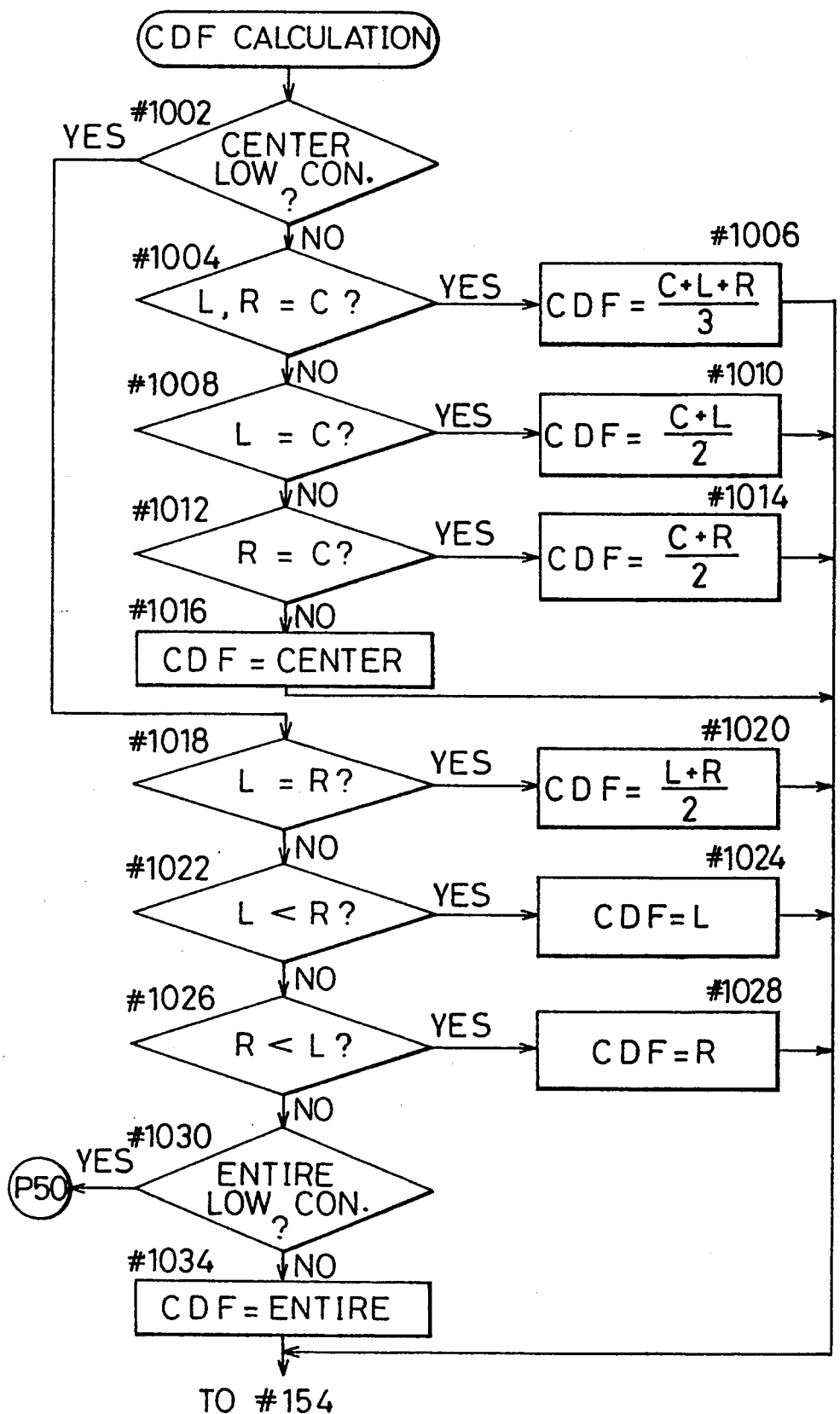
FIG. 16 is a flow chart showing calculation of a control defocus amount of respective focus condition detecting areas.

In Step #150, the phase difference is detected using the phase difference detecting method based on the received light reception signal and the control defocus amount CDF is calculated in accordance with the following procedure shown in FIG. 16 in the CPU 41.

The control defocus amount CDF is calculated for each of the focus condition detecting areas shown in FIG. 9. In FIG. 16 showing how to use the respective focus condition detecting areas properly as well as calculation of control defocus amounts. It will be appreciated that the center, left, right, and entire focus condition detecting areas are respectively referred to as center, left, right and entire areas hereafter.

Basically, the defocus amount corresponding to the center area including the temperature measuring area is prioritized, and accordingly it is first discriminated whether the contrast level of the center area is low in Step #1002. In the case where the defocus amounts corresponding to the left and right areas are obtained at this stage, the following averaging processing is applied in order to increase the accuracy of detecting the focus condition. If the contrast level of the center area is not low (NO in Step #1002), it is discriminated whether the defocus amounts corresponding to the left and right areas are both substantially equal to the one corresponding to the center area in Step #1004. If so, an average value of the defocus amounts corresponding to the center, left, and right areas is calculated as a control defocus amount CDF in Step #1006. If the defocus amount corresponding to only the left area is substantially equal to the one corresponding to the center area (YES in Step #1008), an average value of the defocus amounts corresponding to the center and left areas is calculated as a control defocus amount CDF in Step #1010. Conversely, if the defocus amount corresponding to only the right area is substantially equal to the one corresponding to the center area (YES in Step #1012), an average value of the defocus amounts corresponding to the center and right areas is calculated as a control defocus amount CDF in Step #1014. If the neither defocus amount corresponding to the left nor right area is equal to the one corresponding to the center area (NO in Step #1012), the defocus amount corresponding to the center area is set as a control defocus amount CDF ignoring the defocus amounts corresponding to the left and right areas in Step #1016.

If the contrast level of the center area is low (YES in Step #1002), this routine proceeds to Step #1018. It is discriminated whether the defocus amount corresponding to the left area is substantially equal to the one corresponding to the right area in Step #1018. If so, an average value of these defocus amounts is calculated as a control defocus amount CDF in Step #1020. If the defocus amount corresponding to the left area is smaller than the one corresponding to the right area (YES in Step #1022), the defocus amount corresponding to the right area is set as a control defocus amount CDF in Step #1024. Conversely, if the defocus amount corresponding to the right area is smaller than the one corresponding to the left area (YES in Step #1026), the defocus amount corresponding to the left area is set as a control defocus amount CDF in Step #1028. It should be understood that the defocus amount is positive in the case of the rear focus, while being negative in the case of the front focus. The defocus amounts are compared in the form of real numbers, not absolute numbers.

On the other hand, if the defocus amount corresponding to any of the left and right areas has not been obtained (NO in Step #1026), it is discriminated whether the contrast level of the entire area is low in Step #1030. If so, this routine proceeds to P50. If the contrast level of the entire area is not low (NO in Step #1030), the defocus amount corresponding to the entire area is set as a control defocus amount CDF in Step #1034, and proceeds to Step #154.

In the above-described averaging processing, the mere average value may be calculated. Alternatively, in consideration of contrast values, or the like, a weighted average value may be calculated so as to improve the accuracy. Further, it may be appropriate to omit the defocus amounts in excess of a predetermined value, out of those obtained in the respective blocks, and to calculate an average value from the remaining defocus amounts. The predetermined value is representative of a minimum adjustable focal length which is determined by the extended amount of the barrel 12. In this respect, the defocus amounts in excess of this predetermined value are representative of focal lengths beyond an adjustable range. Thus, such large defocus amounts are more likely to indicate that the light has come from other than the object.

In this calculation, there are also obtained the C value and the YM/C value. In Steps #1002, 1030, it is discriminated whether both of the following conditions are satisfied: 1) the C value is greater than or equal to a constant A1; and 2) the YM/C value is smaller than or equal to a constant B1.

Returning to FIG. 15, in Step #154, a low contrast flag Flc is cleared after it is determined in Step #150 that the contrast level of the object is sufficiently high. Subsequently, it is discriminated whether a tentative flag Ft to be described later (refer to Step #314) is set in Step #156. If the flag Ft is set (YES in Step #156), it is discriminated whether an absolute value of a difference between the control defocus amounts CDF calculated in the present and previous runs lies in a permissible range in Step #158. In this discrimination, the reliability of the previously obtained detected focus condition under the ambient light is determined in the case where the focus condition was detected under the ambient light, but the contrast level was determined to be low in the previous run, and where the focus condition is detected with the aide of the auxiliary light and the contrast level is determined to be sufficiently high in the present run. In other words, if the discrimination result of Step #158 is in the affirmative, a power-saving mode flag Fps is set in Step #160 on the determination that the control defocus amount CDF obtained under the ambient light in the previous run is reliable. Subsequently, the auxiliary light emission mode flag Fal and tentative flag Ft are cleared respectively in Steps #162 and #164, and then P20 follows. On the other hand, if the flag Ft is not set (NO in Step #156), P20 follows immediately.

Figure 17:
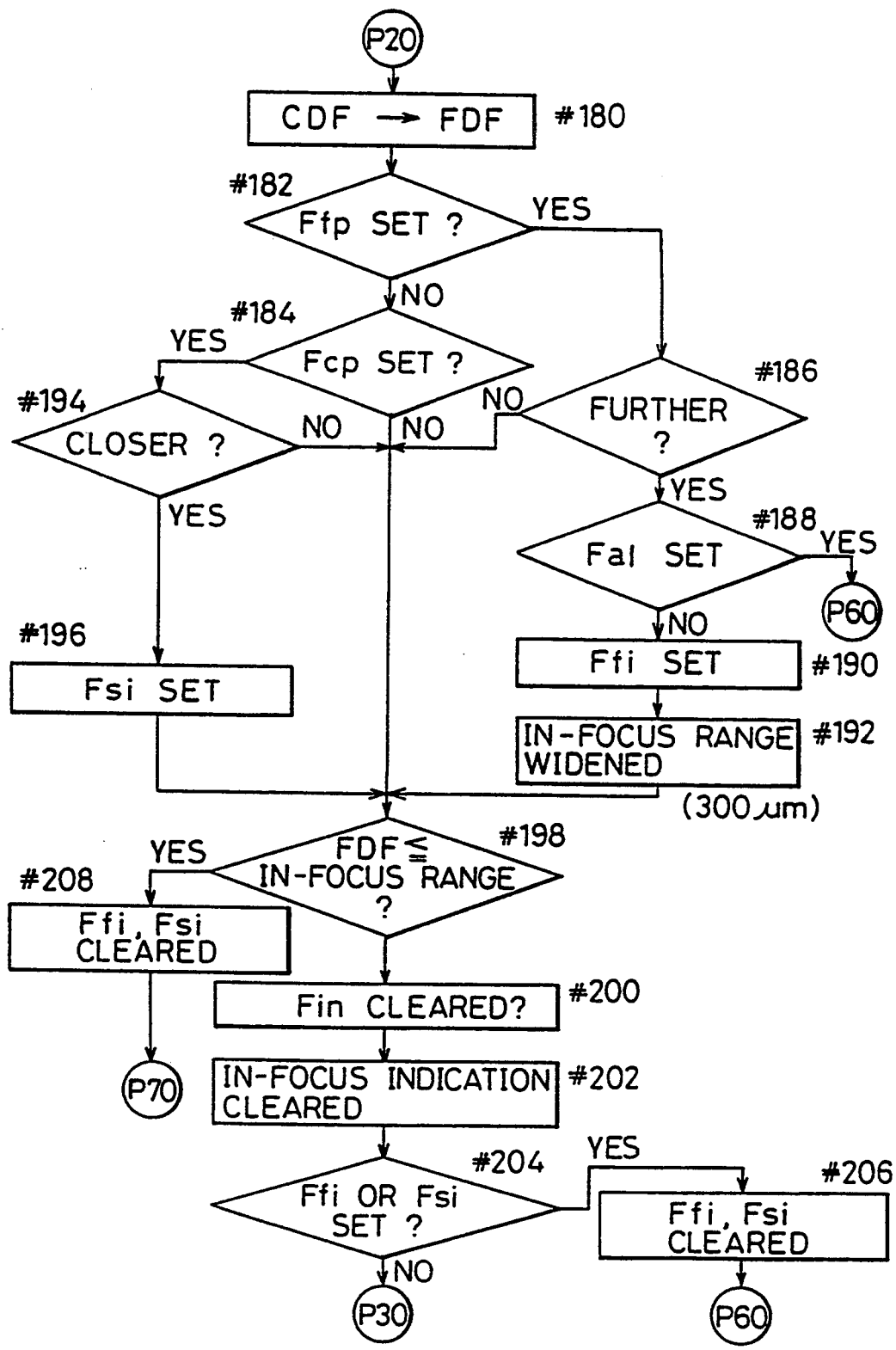
FIG. 17 is a flow chart showing an in-focus determining operation.

FIG. 17 is a flow chart showing an in-focus determining operation.

First of all, the control defocus amount CDF calculated in Step #150 is converted into a corresponding actual lens driving amount FDF in Step #180. Then, it is discriminated whether a furthest possible limit flag Ffp is set, i.e. the objective lens 21 is positioned at the furthest possible limit, in Step #182. Subsequently, it is discriminated whether a closest possible limit flag Fcp is set, i.e. the objective lens 21 is positioned at the closest possible limit in Step #184. If the lens 21 is positioned at the furthest possible limit (YES in Step #182), it is discriminated whether the defocus direction is a further direction in Step #186. If so, it is discriminated whether the auxiliary light emission mode flag Fal is set in Step #188. If the flag Fal is set (YES in Step #188), it is considered impossible to attain the in-focus condition, and there follows P60 in which the low contrast processing is executed. If the flag Fal is not set (NO in Step #188), a first impossible flag Ffi is set in Step #190. The first impossible flag is set when the object is more distant from the radiation thermometer than the furthest limit of the measurable range of the radiation thermometer. At this stage, it is not immediately determined that the contrast level of the object is low. Accordingly, the in-focus range for the lens is slightly widened in Step #192, and this routine proceeds to Step #198.

On the other hand, if the objective lens 21 is positioned at the closest possible limit (YES in Step #184), it is discriminated whether the defocus direction is an closer direction in Step #194. If so, a second impossible flag Fsi is set in Step #196, and this routine proceeds to Step #198. The second impossible flag Fsi is set when the object is closer to the radiation thermometer than the closest limit of the measurable range of the radiation thermometer. If the objective lens 21 is positioned at other than the closest possible and the furthest possible limits, this routine proceeds to Step #198.

In Step #198, it is discriminated whether the lens driving amount FDF converted in Step #180 lies in the specified in-focus range. If the amount FDF lies in the in-focus range (YES in Step #198), the flags Ffi and Fsi are both cleared in Step #208, and there follows P70 in which the in-focus processing is executed. If the amount FDF lies beyond the in-focus range, an in-focus flag Fin is cleared in Step #200 and an in-focus indication is cleared in the LCD unit 51 in Step #202. Subsequently, it is discriminated whether either one of the flags Ffi and Fsi is set in Step #204. If either one of these flags is set, both flags are cleared in Step #206 and there follows P60 in which the low contrast processing is executed. If the flags Ffi and Fsi are both rest, there follows P30 in which the objective lens 21 is driven.

Figure 18:
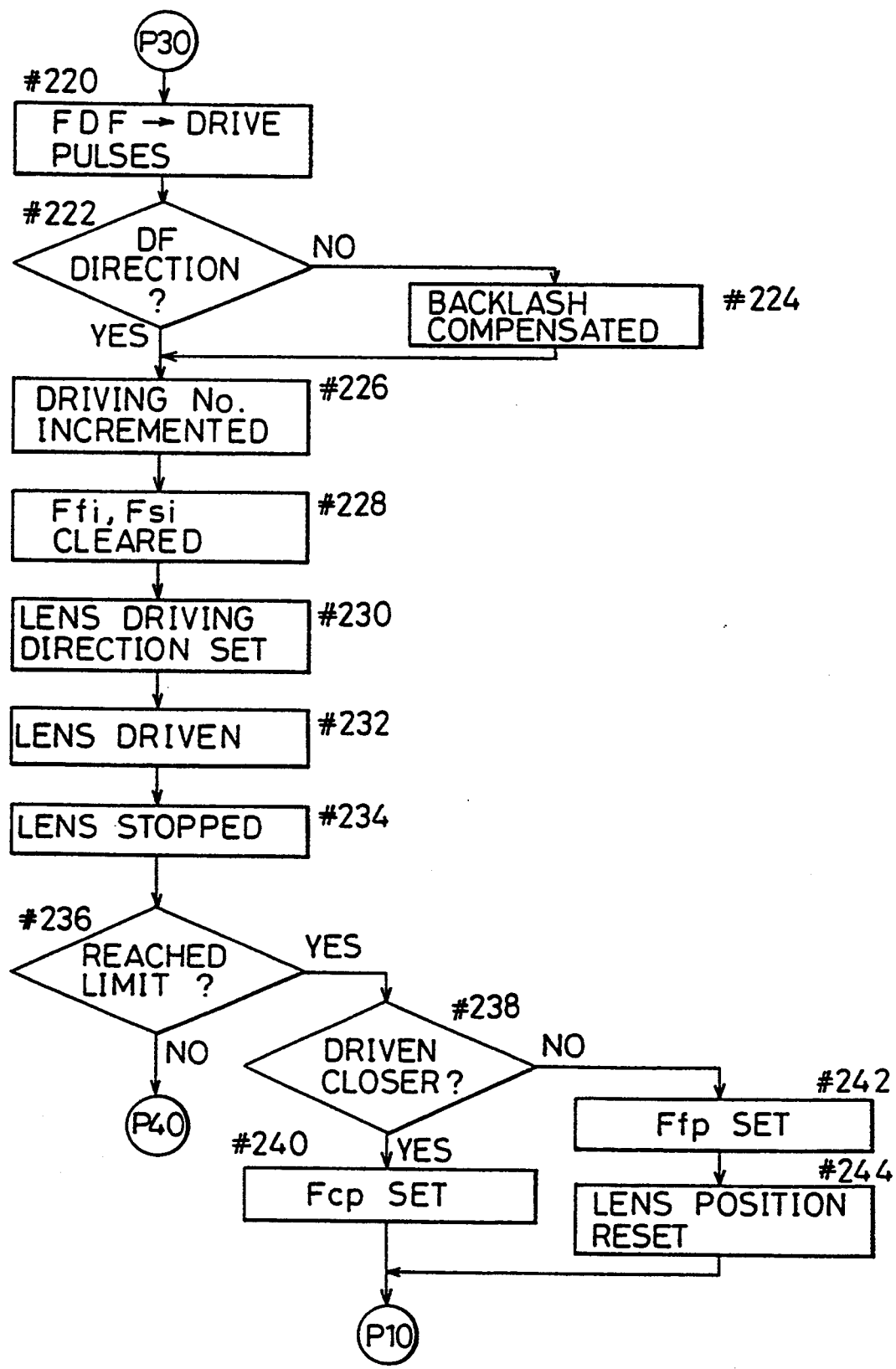
FIG. 18 is a flow chart showing a lens driving operation and a limit checking operation.

FIG. 18 is a flow chart showing a lens driving operation and a limit checking operation.

First of all, the lens driving amount FDF is converted into actual drive pulses applied to the AF motor 44 in Step #220. Then, it is discriminated whether the previous lens driving direction is the defocus direction in Step #222. If so, this routine proceeds to Step #226. If the previous lens driving direction is opposite to the defocus direction, an operation is executed so as to compensate for a backlash in Step #224 and this routine proceeds to Step #226. In Step #226, the lens driving number is incremented by one. Thereafter, the first and second impossible flags Ffi and Fsi are cleared in Step #228; the defocus direction is set as a lens driving direction in Step #230; and the objective lens 21 is driven in Step #232. After the AF motor 44 is driven in accordance with the pulses by the number calculated in Step #220, the driving of the lens 21 is stopped in Step #234. Subsequently, it is discriminated whether the objective lens 21 has reached the either limit in Step #236. If the lens 21 has not reached the limit, there follows P40. If the lens 21 has reached the limit, it is discriminated whether the lens driving direction is the further direction or closer direction in Step #238. If the lens driving direction is the closer direction (YES in Step #238), the closest possible limit flag Fcp is set in Step #240, and there follows P10 in which the focus condition is detected again. On the other hand, the lens driving direction is the further direction, the furthest possible limit flag Ffp is set in Step #242, and the positional data representative of the position of the lens 21 is reset in Step #244, which is followed by P10 in which the focus condition is detected again.

Figure 19:
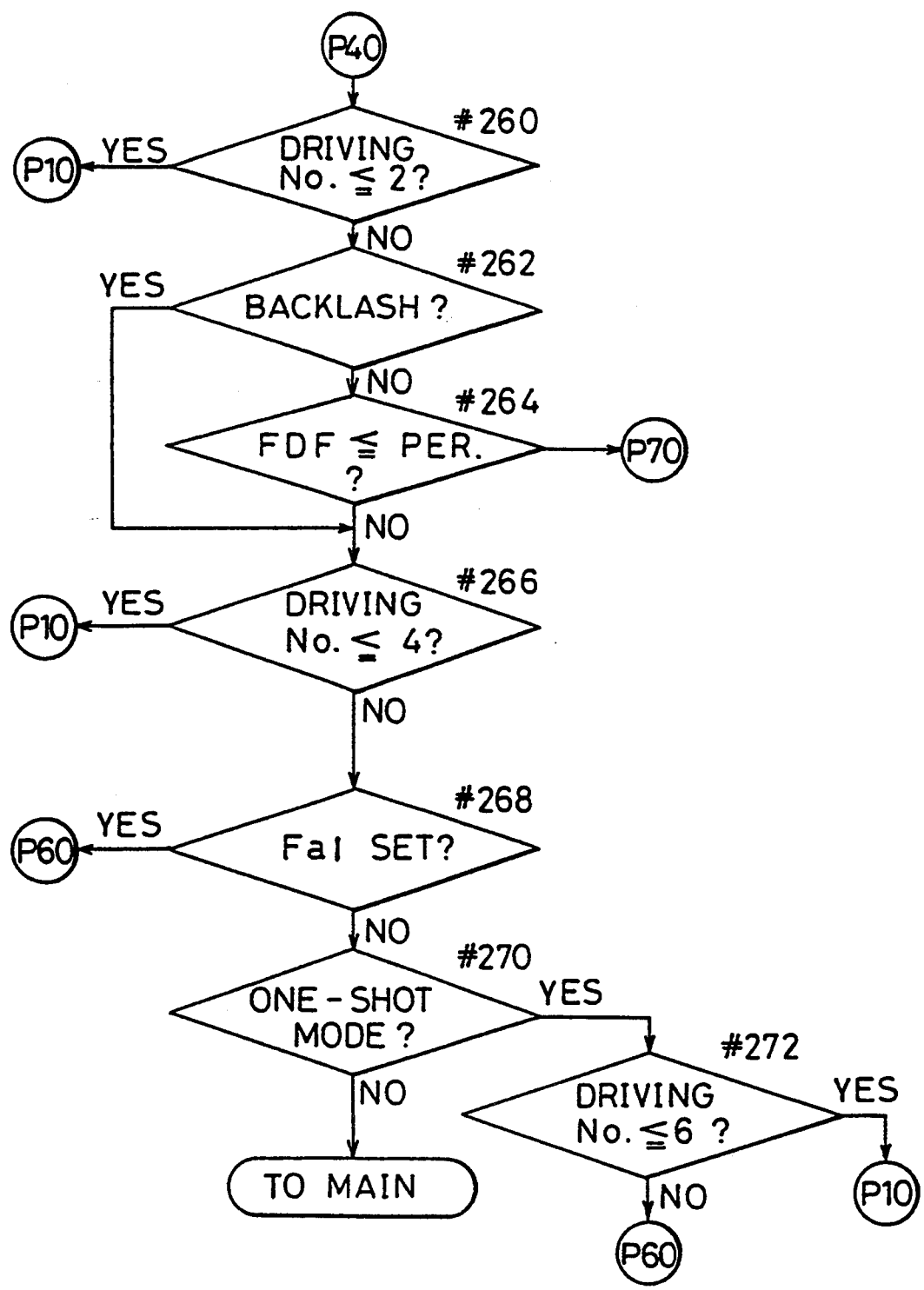
FIG. 19 is a flow chart showing a drive checking operation.

FIG. 19 is a flow chart showing a lens drive checking operation.

First of all, it is discriminated whether the lens driving number is smaller than 2 (=1), i.e. the objective lens 21 has been driven only once in the present AF operation, in Step #260. If the lens driving number is 1 (YES in Step #260), there follows P10 in which the focus condition is detected again. If the lens driving number is greater than 1 (NO in Step #260), it is discriminated whether the backlash compensating operation has been executed in Step #262. If so, this routine proceeds directly to Step #266 in consideration of likelihood that the lens drive to attain the in-focus condition may be unstable. If the backlash compensating operation has not been executed (NO in Step #262), it is discriminated whether the lens driving amount FDF lies in the in-focus range, i.e. a target focal length is attainable after the objective lens 21 is driven by the mount FDF, in Step #264. If the lens driving amount FDF lies in the in-focus range (YES in Step #264), it is assumed that the in-focus condition will be probably attainable and there follows P70 in which the in-focus processing is executed. If the lens driving amount FDF lies beyond the in-focus range, it is discriminated whether the lens driving number is smaller than 4 in Step #266. If the lens driving number is 2 or 3 (YES in Step #266), there follows P10 in which the third or fourth focus condition detection is conducted.

On the other hand, if the lens driving number is 4 or greater (NO in Step #266), it is discriminated whether the auxiliary light emitting mode flag Fal is set in Step #268. If the flag Fal is set (YES in Step #268), there follows P60 in which the low contrast processing is executed. On the other hand, the flag Fal is not set (NO in Step #268), it is discriminated whether the one-shot mode is set in Step #270. If the one-shot mode is not set (NO in Step #270), this routine returns to the main routine, that is, the AF operation is interrupted so as to prioritize the temperature measurement. If the one-shot mode is set (YES in Step #270), it is discriminated whether the lens driving number is smaller than 6 in Step #272. There follows P10 in which the focus condition is detected again if the lens driving number is 4 or 5 (YES in Step #272). If the in-focus condition cannot be attained even when the detection of the focus condition is made six times in the one-shot mode (NO in Step #272), there follows P60 in which the low contrast processing is executed.

Figure 20:
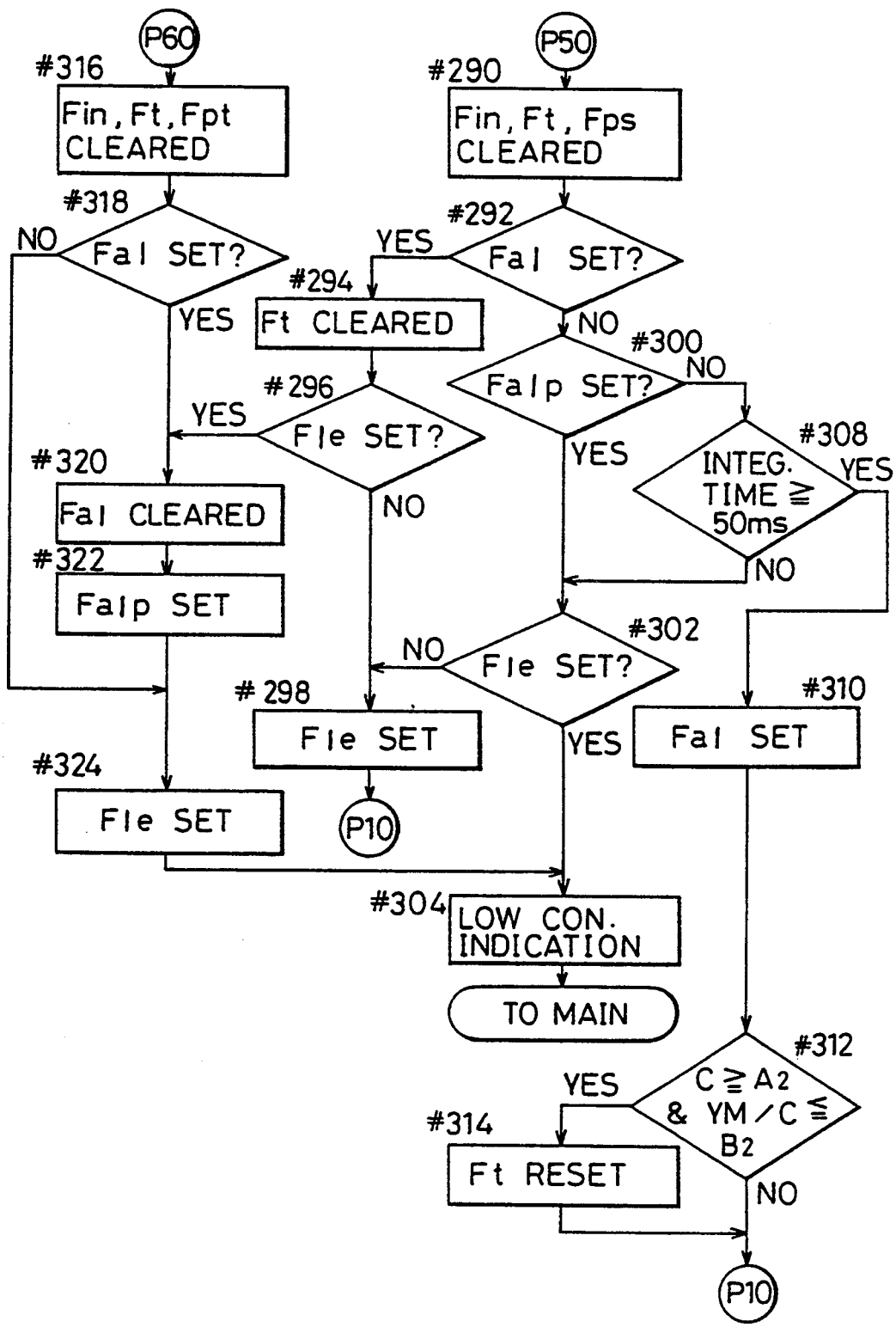
FIG. 20 is a flow chart showing a low contrast processing.

FIG. 20 is a flow chart showing the low contrast processing.

In the case that the contrast level of the object is determined to be low in Step #150, the low contrast processing is executed in P50. In this processing, the focus condition is detected again under a specified condition such as setting of the auxiliary light emission mode.

On the other hand, in the case that the contrast level of the object is determined to be low in Step #188, #206, #268, or #274, there follows P60 in which the low contrast processing is executed.

In P50, the in-focus flag Fin, the tentative flag Ft, and the power-saving flag Fps are all cleared in Step #290. Subsequently, it is discriminated whether the auxiliary light emission mode flag Fal is set in Step #292. If the flag Fal is set (YES in Step #292), the tentative flag Ft is cleared in Step #294. Then, in Step #296, it is discriminated whether the low contrast flag Flc is set. If the flag Flc is set (YES in Step #296), this routine proceeds to Step #320. On the other hand, if the flag Flc is not set (NO in Step #296), the flag Flc is set in Step #298 and there follows P10 in which the focus condition is detected again in the auxiliary light emission mode.

On the other hand, if the flag Fal is not set (NO in Step #292), it is discriminated whether an auxiliary light emission prohibition flag Falp is set in Step #300. If the flag Falp is set (YES in Step #300), it is discriminated whether the low contrast flag Flc is set in Step #302 on the assumption that the detection of the focus condition in the auxiliary light emission mode has been completed. If the flag Flc is set (YES in Step #302), a low contrast indication which indicates that the AF operation is given up for the power-saving purpose is displayed in the LCD unit 51 in Step #304, and returns to the main routine. On the other hand, if the flag Falp is not set (NO in Step #300), it is discriminated that an integrating time of the CCD is 50 ms or longer in Step #308. Based on this discrimination, it is determined whether the auxiliary light is required to detect the focus condition. Specifically, if the integrating time is shorter than 50 ms (NO in Step #308), this routine proceeds to Step #302. If the integrating times is 50 ms or longer (YES in Step #308), it means that the brightness is insufficient. Accordingly, the auxiliary light emission mode flag Fal is set in Step #310. Subsequently, the contrast criterion is slightly eased. In other words, it is discriminated whether the following two conditions are satisfied: 1) the C value is greater than or equal to a tentative determining value A2 (<A1): and 2) the YM/C value is smaller than or equal to a tentative determining value B2 (>B1) in Step #312. If the two conditions are both satisfied (YES in Step #312), the tentative flag Ft is reset in Step #314, followed by P10 in which the focus condition is detected again. If either one of the two conditions is unsatisfied (NO in Step #312), there directly follows P10 in which the focus condition is detected again. In P10, if the discrimination result of Step #258 is in the affirmative, the contrast criterion of Step #152 is eased thereafter on the determination that the focus condition detected previously under the ambient light is reliable.

In P60, the in-focus flag Fin, the tentative flag Ft, and the power-saving flag Fps are all cleared in Step #316. Subsequently, it is discriminated whether the auxiliary light emission mode flag Fal is set in Step #318. If the flag Fal is set (YES in Step #318), the flag Fal is cleared in Step #320, and the auxiliary light emission prohibition flag Falp is set instead in Step #322. The low contrast flag Flc is set in Step #324, and this routine proceeds to Step #304. In Step #304, the low contrast indication is displayed in the LCD unit 51, thereby completing the AF operation.

Figure 21:
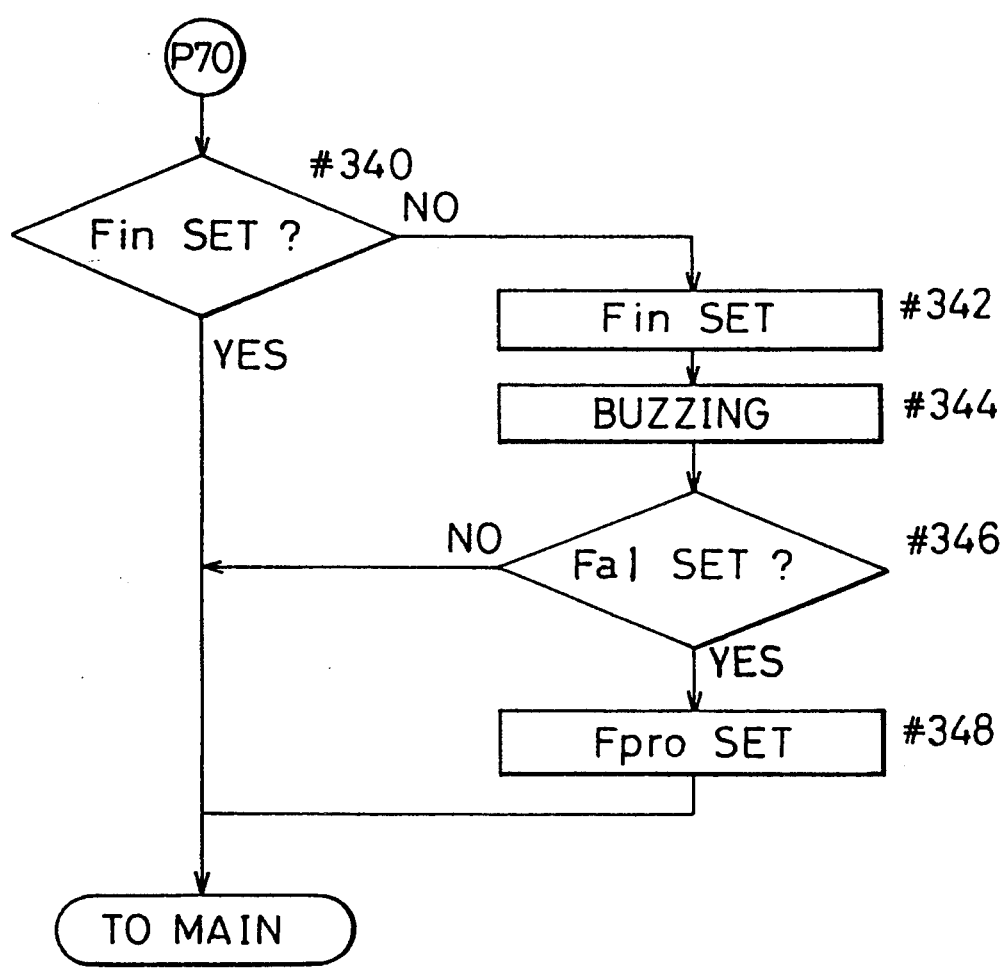
FIG. 21 is a flow chart showing an in-focus processing.

FIG. 21 is a flow chart showing the in-focus processing.

First of all, it is discriminated whether the in-focus flag Fin is set in Step #340. If the flag Fin is not set (NO in Step #340), the flag Fin is set in Step #342. After a buzzing sound is given to inform that the in-focus condition has been attained in Step #344, it is discriminated whether the auxiliary light emission mode flag Fal is set in Step #346. If the flag Fal is set (YES in Step #346), the AF prohibition flag Fpro is set in Step #348, and this routine returns to the main routine. If the flag Fal is not set (NO in Step #346), this routine returns to the main routine. On the other hand, if the flag Fin is set (YES in Step #340), this routine returns directly to the main routine.

The foregoing embodiment is described taking a radiation thermometer as an example. However, the invention is not limited to use in such apparatus, but may be applicable to any measuring apparatus which receives the light from an object to be measured and measures the brightness, an exposure amount, etc. in addition to the temperature of the object.

Figure 22:
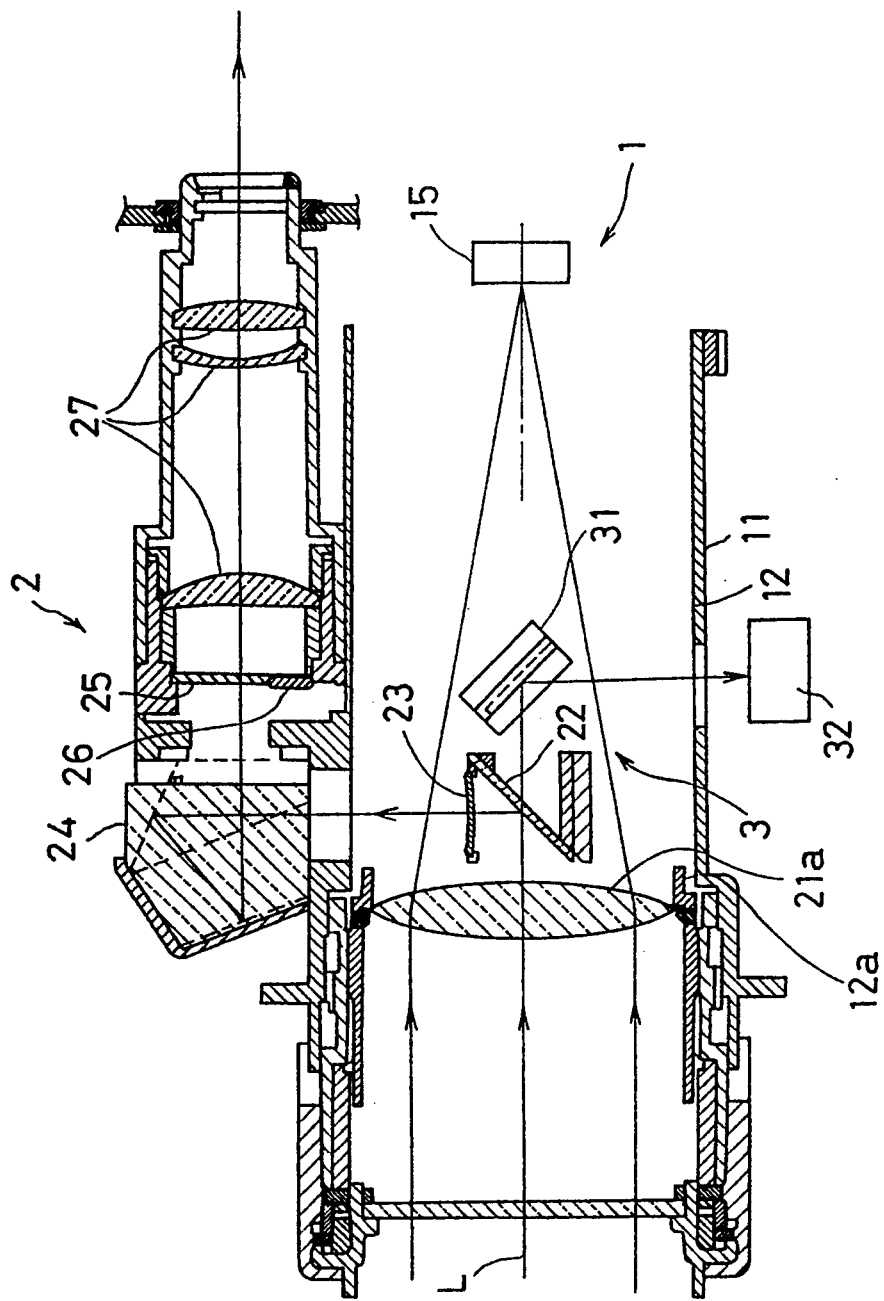
FIG. 22 is a diagram showing a construction of optical systems incorporated into another radiation thermometer according to the invention.

FIG. 22 is a diagram showing a construction of optical systems incorporated in another radiation thermometer according to the invention.

This radiation thermometer includes, similarly to the radiation thermometer shown in FIG. 1, a temperature measuring optical system 1, a viewfinder system 2, and an AF optical system 3. In this embodiment, however, the temperature measuring optical system 1 adopts a dioptric system having an objective lens 21a. Also, the viewfinder system 2 and the AF optical system 3 shares the objective lens 21 with the temperature measuring optical system 1. A portion of light rays transmitted through the objective lens 21a are introduced to the viewfinder system 2 and the AF optical system 3 to reduce the number of parts.

The objective lens 21a is held on a barrel 12a. The barrel 12a is, similarly to the embodiment shown in FIG. 1, rotated by an AF motor over an inner circumferential surface of a hollow cylinder body 11 secured to a main body of the radiation thermometer so that the objective lens 21a moves along an optical axis L. An infrared temperature sensor 15 is fixedly disposed on the optical axis L in a rear portion of the cylinder body 11. The objective lens 21a is moved along the optical axis L by the AF motor so that the infrared rays radiated from the object transmitted through a peripheral portion of the objective lens 21a converges on the temperature sensor 15.

The viewfinder system 2includes a semitransparent mirror 22, a relay lens 23, a pentagonal prism 24, an index plate 25, an internal indicator 26, and an eyepiece lens system 27 in addition to the objective lens 21a. The mirror 22 and the relay lens 23 are fixedly mounted on the hollow cylinder 11.

The AF optical system 3 has further a mirror 31 for turning an optical path downward by 90 degrees and a sensor module 32 for detecting a focus condition. The sensor module 32 includes a CCD line sensor for receiving the light rays from the object.

In this embodiment, the AF operation and temperature measuring operation are executed in accordance with a control sequence identical to that of the radiation thermometer shown in FIG. 1.

However, there is the following problem in this embodiment. The sensor module 32 detects a focus condition based on the light rays transmitted through the objective lens 21a. On the other hand, the temperature sensor 15 detects a temperature based on the infrared rays transmitted through the objective lens 21a. Accordingly, it will be seen that the focal point of a light ray and the focal point of an infrared ray have different distances from the objective lens 21a due to the fact that the wavelength difference between the light ray and the infrared ray causes their respective refraction angles to differ from each other. Also, this focal point difference changes with change in the distance to the object. If the objective lens 21a is moved based on detection of the sensor module 32, for example, the infrared rays are not focussed on the temperature sensor 15.

To solve this problem, the following construction is adopted: On a control portion is provided a memory storing a focal point difference between the infrared ray and the light ray for the objective lens 21a, which is calculated in advance. The movement of the objective lens 21a is controlled by correcting detection of the sensor module 32 based on the stored focal point difference so that the infrared rays transmitted through the objective lens 21a converge on the temperature sensor 15.

Also, it may be appropriate that the sensor module 32 is provided with a filter over the CCD sensor to keep light rays from coming to the CCD sensor. In other words, the sensitivity of the CCD sensor is made to be identical to that of the temperature sensor 15. This construction can eliminate the above-mentioned correction of focal point.

Figure 23:
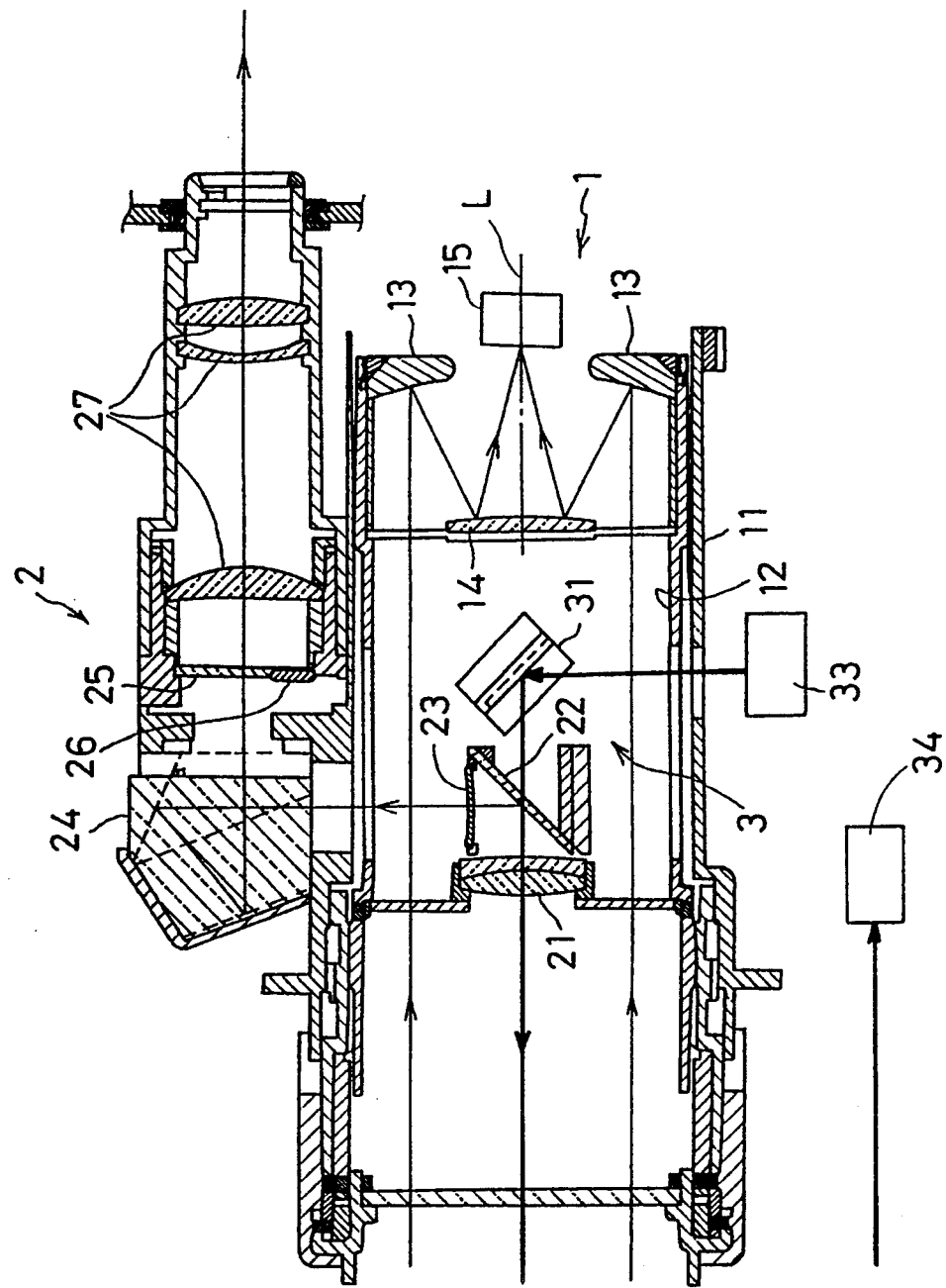
FIG. 23 is a diagram showing a construction of optical systems incorporated into still another radiation thermometer according to the invention.

FIG. 23 is a diagram showing a construction of an optical system incorporated in still another radiation thermometer according to the invention.

The construction of this radiation thermometer is identical to that of the radiation thermometer shown in FIG. 1 except that the focus condition is detected in the triangulation method instead of the phase difference method.

A temperature measuring optical system 1 and a viewfinder system 2 have the same constructions as the embodiment shown in FIG. 1. Also, this radiation thermometer is operated in accordance with the same control sequence as the embodiment shown in FIG. 1.

The temperature measuring optical system 1 includes a concave condenser lens or reflector 13 and a convex reflecting mirror 14, and an infrared temperature sensor 15. The condenser lens 13 and mirror 14 are held on a barrel 12 which is movable along an optical axis L by an AF motor.

The viewfinder system 2 includes an objective lens 21, a semitransparent mirror 22, a relay lens 23, a pentagonal prism 24, an index plate 25, an internal indicator 26, and an eyepiece lens system 27. The mirror 22 and the relay lens 23 are fixedly mounted on the hollow cylinder 11.

An AF optical system 3, which is different from the embodiment shown in FIG. 1, includes a light emitter 33, a mirror 31, and a light receiver 34. The light emitter is made of a light emitting diode or LED and emits a light ray to the mirror 31 which then turns the light ray forward by 90 degrees to direct the light ray to the object. The light receiver 34 is made of a silicon photo diode or PSD and receives the light ray reflected from the object to detect the distance to the object on the basis of triangulation. The barrel 12 is rotated by an AF motor based on a distance detected by the light receiver 34. With the rotation of the barrel 12, the objective lens 21 is moved along the optical axis L, so that the viewfinder system 2 is focused on the object. The condenser lens 13 and mirror 14 of the temperature measuring optical system 1 are moved with the rotation of the barrel 12, so that the infrared rays converge to the temperature sensor 15.

The aforementioned radiation thermometers can be more advantageously used in conjunction with a camera. A camera adapter according to the invention will be described next with reference to FIGS. 24 to 29.

Figure 24:
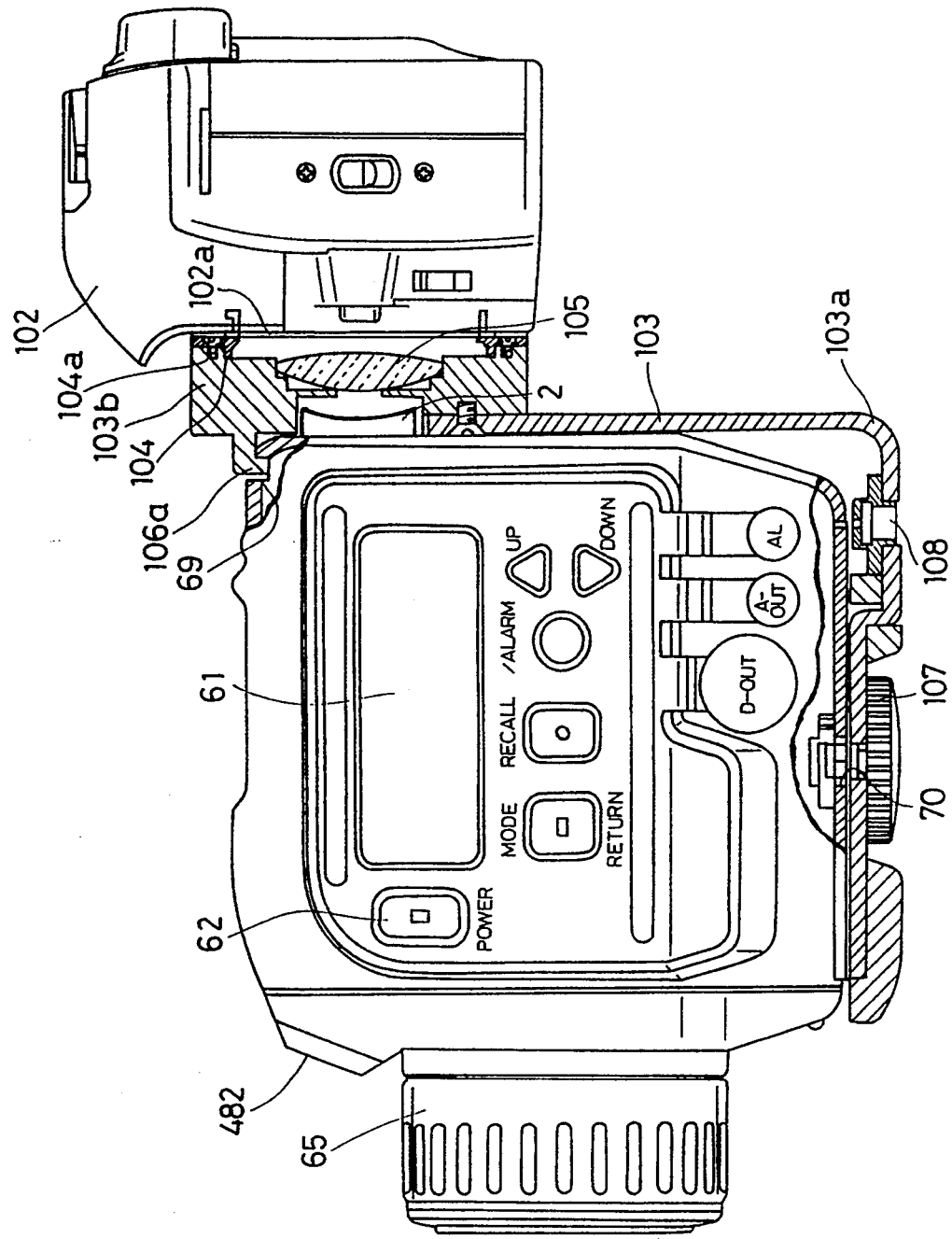
FIG. 24 is an enlarged side view partially in section, showing a state where a camera adapter is attached to a radiation thermometer and a camera is mounted on the camera adapter.
Figure 25:
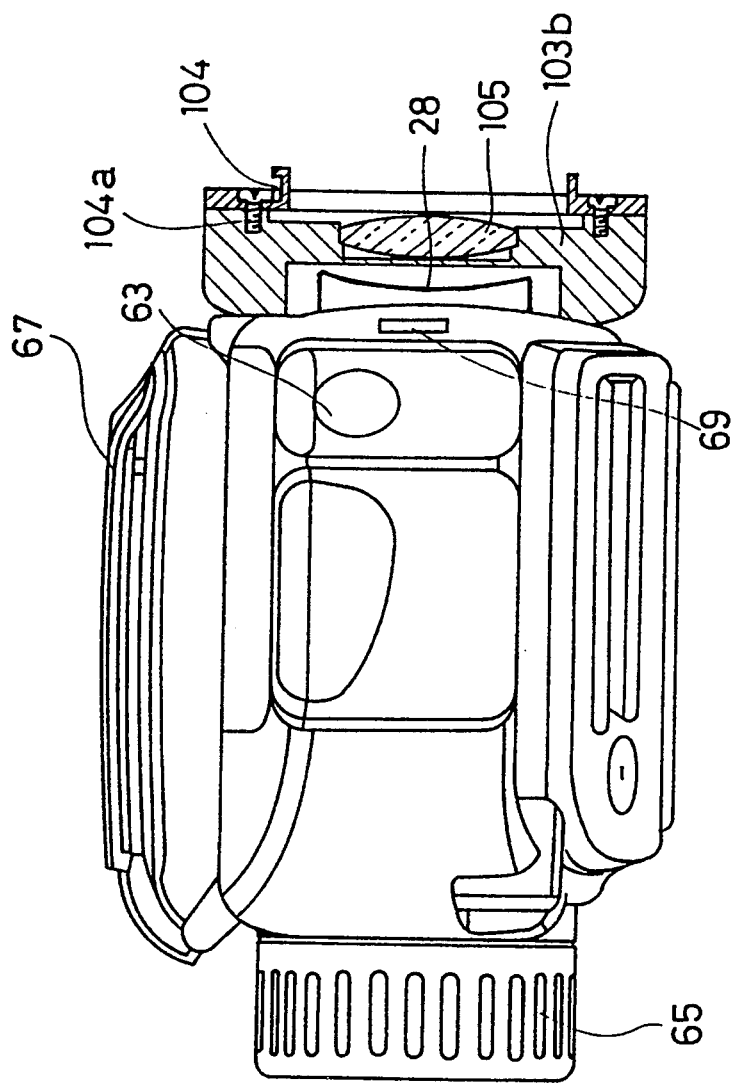
FIG. 25 is an plan view partially in section showing a state where the camera adapter is attached to the radiation thermometer.
Figure 26:
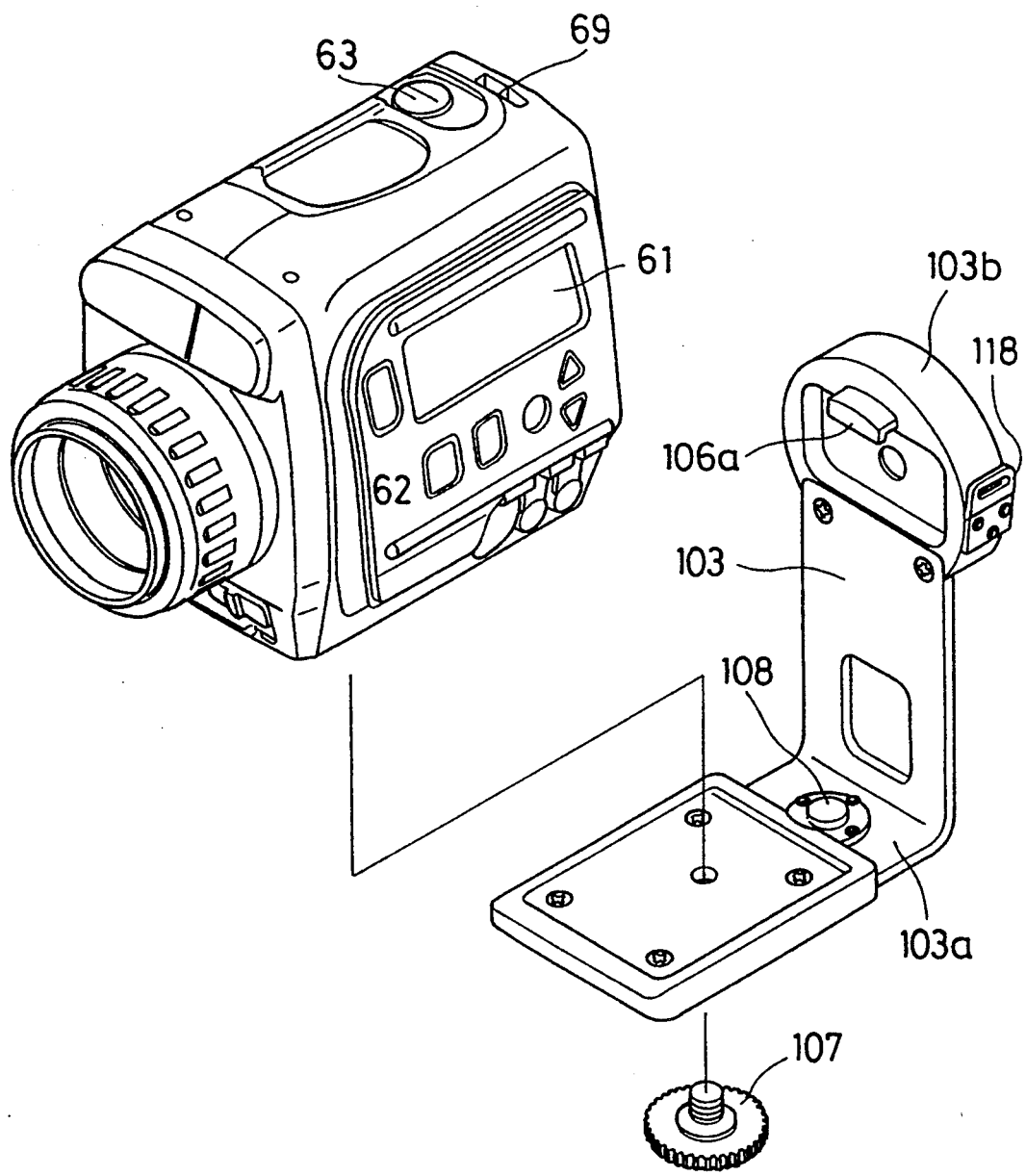
FIG. 26 is a perspective view showing an exterior of the radiation thermometer and the camera adapter.

FIG. 24 is a side view partially in section showing a state where a camera adapter is attached to the radiation thermometer and a camera is mounted on the camera adapter; FIG. 25 is a plan view partially in section showing a state where the camera adapter is attached to the radiation thermometer; FIG. 26 is a perspective view showing an exterior of the radiation thermometer and the camera adapter.

In FIGS. 24, 25, the camera adapter is shown in section. As mentioned earlier, the radiation thermometer is provided internally with the temperature measuring system 1 and the viewfinder system 2 for displaying an image of the object together with an obtained measurement value, etc.

The camera 102 is a single-lens reflex camera, and is attached to the radiation thermometer through the camera adapter 103 so as to face the viewfinder system 2.

The camera adapter 103 includes a mount portion 103a which is attached to the radiation thermometer and a camera mount portion 103b which is attached to the camera 102. The mount portion 103a is an L-shaped member, and the camera mount portion 103b is screwed to an upper end of the mount portion 103a. On the camera mount portion 103b is secured an annular coupler 104 with screws 104a. The coupler 104 has claws arranged in a portion thereof at specified spacings, and has a mount portion 102a of the camera 102 coupled therewith. Further, the camera adapter 103 is provided with a lens 105 through which the measurement value and the object image displayed in the viewfinder system 2 are formed on a plane of a film loaded in the camera 102.

The camera 102 is coupled with the camera mount portion 103b by coupling the mount portion 102a of the camera 102 with the coupler 104 by means of a bayonet coupling. Specifically, the claws of the coupler 104 are engaged with the mount portion 102a. When the coupler 104 is rotated by a specified angle, the coupler 104 is locked with the mount portion 102a. Further, the camera mount portion 103b is also formed with a stopper 106a in the form of a projection which is used to position the camera adapter 103 properly. In a top face of the radiation thermometer is defined a groove 69 which is engageable with the stopper 106a. The camera adapter 103 can be fixedly positioned relative to the radiation thermometer by fitting the stopper 106a in the groove 69. A screw hole is formed in the mount portion 103a in a position corresponding to a screw hole 117 formed on a bottom face of the radiation thermometer. The mount portion 103a is fixed to the radiation thermometer by spirally inserting a fixing screw 107 into the screw holes formed on the mount portion 103a and the radiation thermometer. Another screw hole 108 is formed in the mount portion 103a so as to fix the camera adapter 103 to a tripod or the like. On the camera mount portion 103b is provided strap mount fittings 118.

The radiation thermometer is provided with the main switch 62 which is turned on to apply power to the radiation thermometer, the indicator 61 including a liquid crystal display or the like for displaying various information, the focus adjuster 65, and the measurement switch 63. Further, on a side of the radiation thermometer is provided a key unit including a variety of keys for setting various operations. A finder frame 28 is provided around the eyepiece lens 27 of the viewfinder system 2 of the radiation thermometer.

Figure 27:
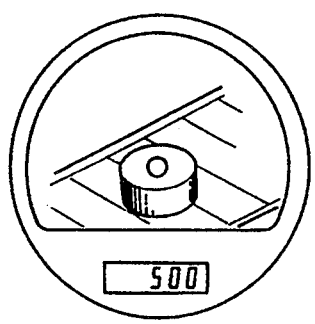
FIG. 27 is a diagram showing what is to be viewed through a viewfinder of the radiation thermometer.

The camera mount portion 103b is so formed as to surround the finder frame 28. The camera adapter 103 is constructed such that optical axes of an optical system of the viewfinder system 2, of the lens 105, and of the camera 102 correspond with one another by attaching the camera adapter 103 to the radiation thermometer and mounting the camera 2 to the camera mount portion 103b. What will be viewed through the viewfinder system 2 of the radiation thermometer is shown in FIG. 27 as an example. This is formed on the plane of the film loaded in the camera 102 through the lens 105.

Figure 28:
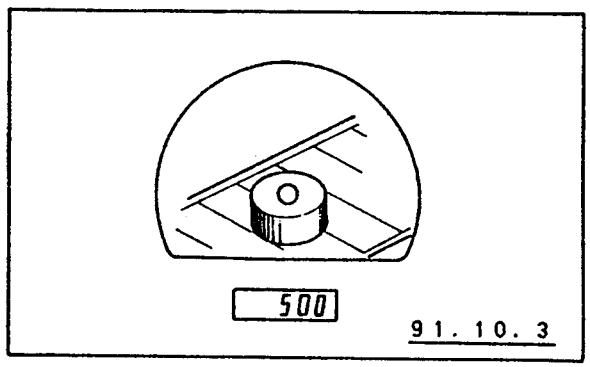
FIG. 28 is a diagram showing an exemplary picture photographed by the camera.

Thus constructed camera adapter 103 is attached to the bottom and rear faces of the radiation thermometer. At this time, the stopper 106a is fitted in the groove 69, thereby positioning the camera adapter 103 properly, and then the fixing screw 107 is spirally inserted into the screw hole 70 formed in the bottom surface of the radiation thermometer. In this way, the camera adapter 103 and the radiation thermometer are fixed to each other. Further, the camera 102 is coupled with the coupler 104 of the camera adapter 103. Thereafter, the radiation thermometer is brought into a measuring state, and an operator is allowed to see a finder information of the radiation thermometer through a viewfinder of the camera 102. FIG. 28 shows an exemplary picture photographed by the camera 102 attached to the radiation thermometer through the camera adapter 103. It is appropriate to determine a focal length of the lens 105 such that an image in the picture is as large as the one shown in FIG. 27, for such an image can be clearly seen. Alternatively, the focal length of the lens 105 may be determined such that, in the case where a date or like data is imprinted by means of a data imprinting device, such a data does not overlap with the displayed image.

With the radiation thermometer, as mentioned earlier, the main switch 110 is turned on, and the keys provided in the key unit are operated to select an emissivity and a measurement mode (instantaneous value, peak value, etc.), the measurement switch 63 is thereafter depressed on. The radiation thermometer continues to measure the temperature of the object while the switch 63 is depressed. Accordingly, the temperature measuring area is continued to be displayed in the viewfinder system 2 together with the measurement value as shown in FIG. 27. This information can be confirmed by looking through the viewfinder of the camera 102 because the camera 102 is a single-lens reflex camera. When the measurement switch 63 is released from a depressed state after a desired measurement is obtained, the measurement value at this instance is displayed still. Thereafter, a shutter of the camera 102 is released, and thereby the measurement value and the object image are recorded on the film. By obtaining a picture from this film, it becomes easier to indicate the measurement value and the measuring condition in a report or the like.

When the camera attached radiation thermometer is used, an operator may hold the bottom portion of the radiation thermometer with his left hand while holding a portion of the camera 102 where a shutter release button is provided with his right hand. However, in this operating state, the operator is inconveniently compelled to depress both the shutter release button of the camera 102 and the measurement switch 63 of the radiation thermometer with his right hand.

Figure 29:
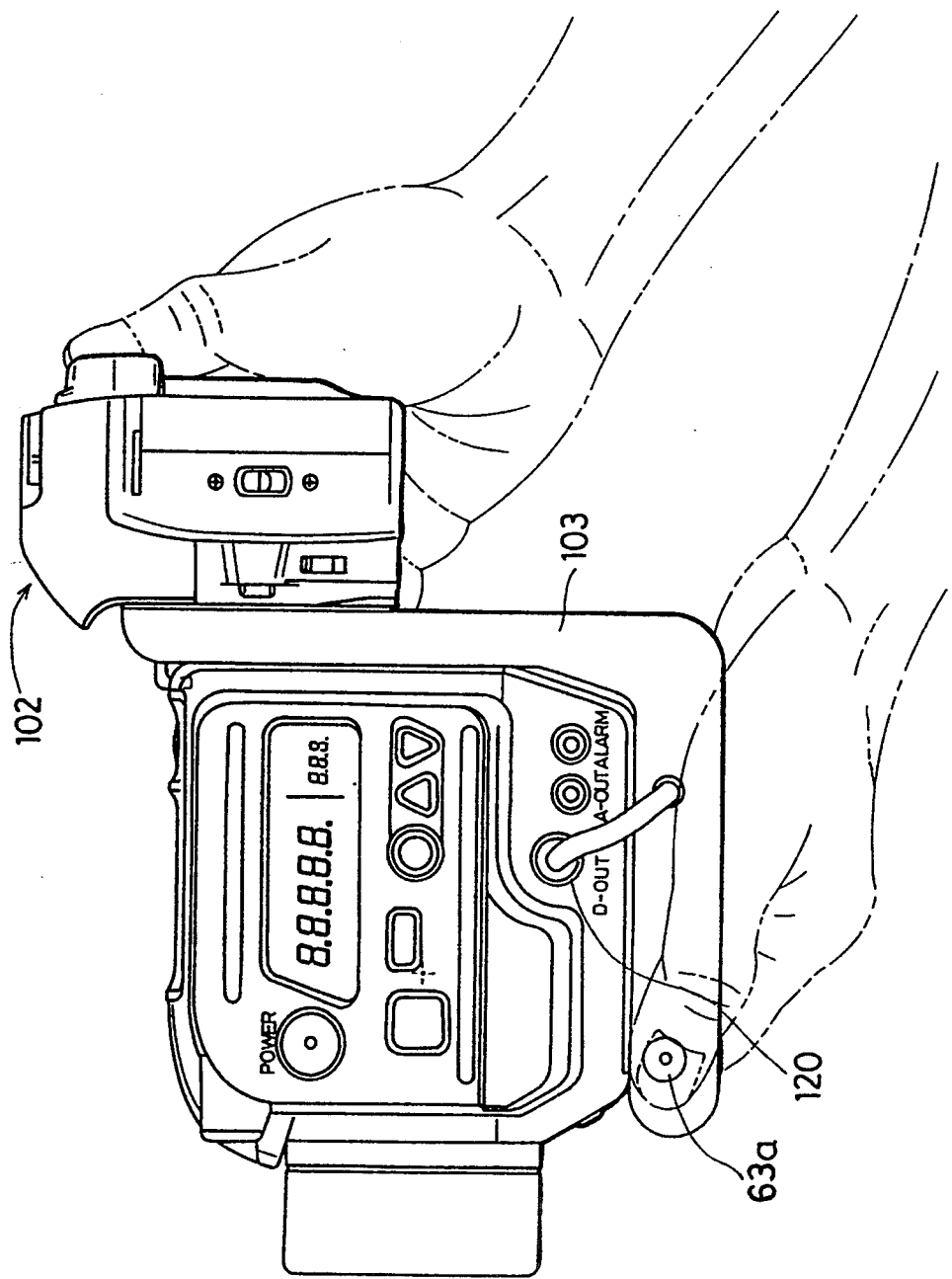
FIG. 29 is a side view partially in section, showing a state where another camera adapter is attached to the radiation thermometer and a camera is mounted on this camera adapter.

In view of this, an arrangement as shown in FIG. 29 can be considered. In this example, another measurement switch 63a is provided in the camera adapter 103, and a more convenient switch out of the switches 63, 63a is selectively depressed to conduct the temperature measurement. Accordingly, the operator is allowed to depress the switch 63a readily and easily with his left hand, and there is no need to depress two buttons with his right hand. In this case, a switching mechanism is necessary so as to switch an electric connection of the switches 63, 63a between the radiation thermometer and the camera adapter 103.

In this embodiment, a terminal provided in the radiation thermometer for transferring an electrical information to and from external devices is used for this purpose.

A D-OUT terminal 120 shown in FIG. 29 is a socket terminal for outputting a digital data which is used when the data communication is conducted between the radiation thermometer and a personal communication or special data processor. Normally, a connector including a multitude of pins is connected to the terminal 120. A pin having a function of a measurement switch is assigned to the terminal 120, to which a plug connected to the measurement switch 63a of the camera adapter 103 through an electric wire is inserted. In this way, the radiation thermometer is electrically conducted to the measurement switch 63a of the camera adapter 103. The radiation thermometer is further provided with other sockets such as an analog voltage output terminal which is connected to a recorder or the like, and an alarm output terminal through which an external warning device is actuated, for example, when the temperature rises or falls to an abnormal level. Although small double pole jacks are inserted into these sockets, triple pole jacks may be inserted thereto so as to allow the sockets have the function of the measurement switch.

The invention is not limited to the foregoing embodiment, but may be modified in various manners. For instance, the following modification can be considered. In the foregoing embodiment, the measurement value and the object image are photographed after the measuring state is interrupted by manipulating the measurement switch 63 so as to make the display still. However, the radiation thermometer may be brought into a continuous measuring state, and the proper measurement value and object image may be photographed at any time. More specifically, the radiation thermometer may be so constructed as to enter a continuous measurement mode when the main switch 62 is turned on while the measurement switch 63 of the radiation thermometer is depressed. Thereafter, the measurement is continued even if the measurement switch 63 is released from its depressed state. This will improve the operability of the radiation thermometer. Further, the mounting of the camera 102 to the camera mount portion 103a of the camera 103 is not limited to the bayonet coupling, but various other couplings may be employed. Moreover, the camera is not limited to a camera used in conjunction with a film, but may be a video camera. In this case, the operator is allowed to see a similar image displayed on a monitor screen, instead of a picture.

The invention is not limited in its application to a radiation thermometer, but may be applicable to similar optical measuring apparatuses such as a luminance meter and an exposure meter.

With the use of a camera adapter as described above, a camera can be attached to a radiation thermometer and a measurement value and an image of an object to be measured which are displayed in a viewfinder system of the radiation thermometer can be photographed, and recorded in the form of a picture. Since an optical axis of the radiation thermometer corresponds with that of the camera in this state, the measurement value can be obtained accurately in correspondence with a temperature measuring area, thereby presenting a temperature measuring condition more precisely. Further, the operability is improved since the radiation thermometer and the camera is integrally assembled.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A radiation thermometer comprising:

sensor means for detecting an intensity of infrared radiation of light;

a measuring optical system for introducing light from an object to the sensor means;

calculator means for calculating a temperature of the object based on a detected infrared radiation intensity;

a viewfinder optical system, different from the measuring optical system, for introducing light from the object so as to allow the operator to visually recognize the object;

focus detecting means for receiving a part of light divided from the light in the viewfinder optical system and automatically detecting a focus condition of the viewfinder optical system relative to the object; and controller means responsive to the focus detection means for automatically controlling both the measuring and viewfinder optical systems so that both the optical systems come into an in-focus condition relative to the object.

2. A radiation thermometer as defined in claim 1 wherein:

the measuring optical system includes a first optical member movable along an optical axis thereof;

the viewfinder optical system includes a second optical member movable along an optical axis thereof; and the controller means includes driver means for moving the first optical member and the second optical member along the optical axis to the same extent as each other.

3. A radiation thermometer as defined in claim 2 wherein the focal length of the first optical member is different from that of the second optical member.

4. A radiation thermometer as defined in claim 1 wherein:

the measuring optical system includes a first optical member movable along an optical axis thereof;

the viewfinder optical system includes a second optical member movable along an optical axis thereof; and the controller means includes driver means for moving the first optical member and the second optical member along the optical axis to different extents from each other.

5. A radiation thermometer as defined in claim 1 wherein the focus detection means includes a sensor sensitive to visible radiation.

6. A radiation thermometer as defined in claim 1 wherein the focus detection means includes a sensor sensitive to infrared radiation.

7. A radiation thermometer comprising:

sensor means for detecting an intensity of infrared radiation of light;

a first optical system for introducing light from an object to the sensor means;

calculator means for calculating a temperature of the object based on a detected infrared radiation intensity;

a photo sensor;

a second optical system, different from the first optical system, for introducing light from the object to the photo sensor;

focus detection means for automatically detecting a focus condition of the second optical system based on an output of the photo sensor; and controller means responsive to the focus detection means for automatically controlling both the first and second optical systems so that both the optical systems come into an in-focus condition relative to the object.

8. A radiation thermometer as defined in claim 7 wherein the second optical system introduces to the photo sensor the light being passed through the first optical system.

9. A radiation thermometer as defined in claim 7 wherein the second optical system introduces to the photo sensor the light being not passed through the first optical system.

10. A radiation thermometer as defined in claim 9 wherein:

the first optical system includes a first movable optical member; and the second optical system includes a second movable optical member, the second movable optical member being movable integrally with the first movable optical member.

11. A radiation thermometer as defined in claim 7 wherein:

the first optical system includes a first optical member movable along an optical axis thereof;

the second optical system includes a second optical member movable along an optical axis thereof; and the controller means includes driver means for moving the first optical member and the second optical member along the optical axis to the same extent as each other.

12. A radiation thermometer as defined in claim 11 wherein the focal length of the first optical member is different from that of the second optical member.

13. A radiation thermometer as defined in claim 7 wherein:

the first optical system includes a first optical member movable along an optical axis thereof;

the second optical system includes a second optical member movable along an optical axis thereof; and the controller means includes driver means for moving the first optical member and the second optical member along the optical axis to different extents from each other.

14. A radiation thermometer as defined in claim 7 wherein:

the measuring optical system introduces light from a first detection area of the object to the sensor means;

the focussing optical system introduces light from a second detection area of the object to the photo sensor, the second detection area being larger than the first detection area, and including the first detection area therein.

15. A radiation thermometer comprising:

sensor means for detecting an intensity of infrared radiation of light;

a measuring optical system for introducing light from an object to the sensor means;

calculator means for calculating a temperature of the object based on a detected infrared radiation intensity;

focus detection means for detecting focus condition of the measuring optical system by a phase difference detecting method;

controller means responsive to the focus detection means for controlling the measuring optical system so as to come into a desired focus condition.

16. A radiation thermometer comprising:

sensor means for detecting an intensity of infrared radiation of light;

a measuring optical system for introducing light from an object to the sensor means;

calculator means for calculating a temperature of the object based on a detected infrared radiation intensity;

distance detection means for detecting a distance to the object; and controller means responsive to the distance detection means for controlling the measuring optical system so as to come into a desired focus condition.

17. A light measuring apparatus comprising:

sensor means for detecting an intensity of light;

a measuring optical system for introducing light from a first detection area of an object to the sensor means;

calculator means for executing a predetermined calculation based on a detected light intensity;

focus detection means for detecting focus condition of the measuring optical system, the focus detection means including:

a photo sensor; and a focussing optical system for introducing light from a second detection area of the object to the photo sensor, the second detection area being larger than the first detection area with including the first detection area therein;

controller means responsive to the focus detection means for controlling the measuring optical system so as to come into an in-focus condition.

18. A light measuring apparatus comprising:

a first sensor sensitive to first electromagnetic radiation having a first range of wavelengths;

a second sensor sensitive to second electromagnetic radiation having a second range of wavelengths different from the first electromagnetic radiation;

a first optical system for introducing electromagnetic radiation from an object to the first sensor;

a second optical system, different from the first optical system, for introducing the electromagnetic radiation from the object to the second sensor;

focus detection means for automatically detecting a focus condition of the second optical system based on an output of the second sensor; and controller means responsive to the focus detection means for automatically controlling at least the first optical system so as to come into an in-focus condition relative to the object.

19. A radiation thermometer assembly comprising:

an optical system for imaging a target;

a first detector;

means for directing radiation from the target to the first detector for providing a temperature signal representative of the temperature of the target;

means responsive to the focus signal to calculate a focus condition signal;

means responsive to the temperature signal for automatically calculating a temperature of the target;

a second detector;

means for directing radiation from the target to the second detector for providing a focus signal representative of the focus state of the optical system relative to the target;

means responsive to the focus signal to calculate a focus condition signal;

means responsive to the focus condition signal to drive the optical system to an in-focus condition relative to the target; and means for coordinating the temperature signal with the in-focus condition so that the optical system is first focused on the target and then subsequently the temperature signal is measured to calculate the temperature of the object.

20. The radiation thermometer assembly of claim 19, wherein the first detector has a first surface area for receiving radiation and the second detector has a second surface area for receiving radiation, the size of the second surface area is significantly larger than the first surface area.

21. The radiation thermometer assembly of claim 19, wherein the means for coordinating includes an auxiliary light that is projected on the target to provide radiation for the second detector.

22. The radiation thermometer assembly of claim 21 further including means for projecting the auxiliary light in a pattern image of varying contrasts.

23. The radiation thermometer assembly of claim 19, wherein the means responsive to the focus signal includes a table of values stored to provide relative in-focus positions for infrared radiation and visible light.

24. The radiation thermometer assembly of claim 19 further including a viewfinder optical system for permitting an operator to view the target through the optical system and adapter means connected to the optical system to enable a camera to be connected to the optical system.

25. The radiation thermometer assembly of claim 24 further including a display member mounted in the viewfinder optical system for providing a superimposed temperature output in combination with an image of the target.

26. The radiation thermometer assembly of claim 25 further including a camera connected to the adapter means to record the target image and superimposed temperature output.

27. The radiation thermometer assembly of claim 26 further including an auxiliary light for projecting a pattern on the target.

28. The radiation thermometer assembly of claim 27 further including a circuit means to coordinate temperature measurement with projection of the auxiliary light.

29. The radiation thermometer assembly of claim 28, wherein the means for automatically calculating a focus signal includes means for rotating the second detector.

30. The radiation thermometer assembly of claim 27 further including a plurality of detecting areas on the second detector and means for selecting from the detecting areas to generate a focus signal.

* * * * *